(12) United States Patent
Ito et al.

(10) Patent No.: US 8,445,613 B2
(45) Date of Patent: *May 21, 2013

(54) POLYMER AND SURFACE-TREATING AGENT CONTAINING THE POLYMER

(75) Inventors: Kenya Ito, Ichihara (JP); Hisao Oikawa, Ichihara (JP); Koji Ohguma, Ichihara (JP); Mikio Yamahiro, Ichihara (JP)

(73) Assignee: JNC Corporation, Tokyo (JP)

(*) Notice: Subject to any disclaimer, the term of this patent is extended or adjusted under 35 U.S.C. 154(b) by 293 days.

This patent is subject to a terminal disclaimer.

(21) Appl. No.: 12/531,606

(22) PCT Filed: Mar. 21, 2008

(86) PCT No.: PCT/JP2008/055218
§ 371 (c)(1),
(2), (4) Date: Feb. 2, 2010

(87) PCT Pub. No.: WO2008/123122
PCT Pub. Date: Oct. 16, 2008

(65) Prior Publication Data
US 2010/0137540 A1    Jun. 3, 2010

(30) Foreign Application Priority Data
Mar. 23, 2007   (JP) ................................. 2007-077576

(51) Int. Cl.
*C08F 30/08*   (2006.01)
(52) U.S. Cl.
USPC ........ 526/279; 526/319; 526/328; 526/328.5; 526/329.2; 526/346; 526/347; 526/347.1; 428/500

(58) Field of Classification Search
None
See application file for complete search history.

(56) References Cited

U.S. PATENT DOCUMENTS

| | | | |
|---|---|---|---|
| 5,777,052 A * | 7/1998 | Kobayashi et al. | 526/279 |
| 7,687,593 B2 * | 3/2010 | Yamahiro et al. | 528/31 |
| 7,868,112 B2 * | 1/2011 | Oikawa et al. | 526/279 |
| 7,989,560 B2 * | 8/2011 | Oikawa et al. | 525/455 |
| 2007/0135602 A1 * | 6/2007 | Yamahiro et al. | 526/242 |
| 2010/0063222 A1 | 3/2010 | Oikawa et al. | |
| 2010/0093951 A1 | 4/2010 | Oikawa et al. | |

FOREIGN PATENT DOCUMENTS

| | | |
|---|---|---|
| EP | 2096128 A1 | 9/2009 |
| EP | 2103636 A1 | 9/2009 |
| JP | 10-147639 | 6/1998 |
| JP | 10-251352 | 9/1998 |
| JP | 2004-043671 | 2/2004 |
| JP | 2004-155847 | 6/2004 |
| JP | 2005-029743 | 2/2005 |
| JP | 2005-105265 | 4/2005 |
| JP | 2005-272506 | 10/2005 |
| JP | 2005-350560 | 12/2005 |
| JP | 2006-117742 | 5/2006 |
| JP | 2006-299016 | 11/2006 |
| WO | WO 2006/129800 A1 * | 12/2006 |

OTHER PUBLICATIONS

Machine translation for KR 2008/0016929.*
Espacenet record for WO 2006/129800 including bibliographic data.*
European search report for corresponding European application 08722582.7 lists the references above.

* cited by examiner

*Primary Examiner* — Marc Zimmer
(74) *Attorney, Agent, or Firm* — Hogan Lovells US LLP

(57) ABSTRACT

A polymer and a treating agent (such as a surface-treating agent) are provided that have excellent characteristics in such properties as water repellency, oil repellency, antifouling property and charge controlling property. The polymer contains a structural unit derived from fluorosilsesquioxane having an addition polymerizable group, or contains a structural unit derived from fluorosilsesquioxane having an addition polymerizable group and a structural unit derived from organopolysiloxane having an addition polymerizable group. The treating agent contains the polymer. An article treated with the treating agent is also provided.

7 Claims, 2 Drawing Sheets

POLYMER AND SURFACE-TREATING AGENT CONTAINING THE POLYMER

CROSS-REFERENCE TO THE RELATED APPLICATIONS

This application is a national stage of international application No. PCT/JP2008/055218 filed on Mar. 21, 2008, which also claims the benefit of priority under 35 USC 119 to Japanese Patent Application No. 2007-077576 filed on Mar. 23, 2007, the entire contents of which are incorporated herein by reference.

BACKGROUND OF THE INVENTION

1. Field of the Invention

The present invention relates to a polymer and a surface-treating agent or the like containing the polymer, and also relates to an article treated with the surface-treating agent.

2. Description of Related Art

Silsesquioxane is polysiloxane that has a characteristic structure. The structural characteristics of silsesquioxane include, for example, a cubic inorganic skeleton containing —SiO— units, and organic groups (such as reactive groups and polymerizable groups) bonded to the eight silicon atoms constituting the cubic inorganic skeleton. Various functions, such as enhancement of affinity to various materials, can be imparted to silsesquioxane by selecting and designing the organic groups bonded to the silicon atoms.

Specifically, J. F. Brown, et al. have found that silsesquioxane is obtained from monoalkyltrichlorosilane (J. Am. Chem. Soc., vol. 87, p. 4313 (1965)), but the method proposed therein is not practical due to a prolonged reaction time required.

F. J. Feher, and J. D. Lichtenhan, et al. have shown a method for introducing various polymerizable substituent, such as a vinyl group, an epoxy group and an acrylate group, to a trisilanol having such structure obtained by removing a silicon atom from silsesquioxane (J. Am. Chem. Soc., vol. 111, p. 1741 (1989), J. Am. Chem. Soc., vol. 112, p. 1931 (1990), Organometallics, vol. 10, p. 2526 (1991), Macromolecules, vol. 28, p. 8435 (1995), and Appl. Organometal. Chem., vol. 12, p. 707 (1998)). However, materials obtained by the method fail to satisfy such functions as water repellency, oil repellency and antifouling property that are required for a surface-treating agent or the like.

SUMMARY OF THE INVENTION

An object of the invention is to provide a polymer that has excellent characteristics in such properties as water repellency, oil repellency, antifouling property and charge controlling property. Another object of the invention is to provide a surface-treating agent or the like (which may be hereinafter referred simply to as a treating agent) that has excellent characteristics in such properties as water repellency, oil repellency, antifouling property and charge controlling property. Still another object of the invention is to provide an article that is treated with the surface-treating agent or the like. Other objects and advantages of the invention will be apparent from the description.

The inventors have found a polymer containing a structural unit derived from fluorosilsesquioxane having an addition polymerizable group, or containing a structural unit derived from fluorosilsesquioxane having an addition polymerizable group and a structural unit derived from organopolysiloxane having an addition polymerizable group, and the invention has been completed based on the findings.

The invention relates to, as aspects, a polymer; a method for producing the polymer; a surface-treating agent, a water-repelling and oil-repelling treating agent, an antifouling treating agent and a charge controlling treating agent that each contain the polymer; and an article that is treated with the treating agents.

[1] A polymer containing a constitutional unit 1 represented by the formula (1):

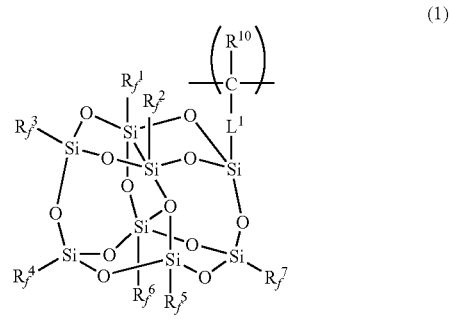

(1)

wherein $R_f^1$ to $R_f^7$ each independently represent fluoroalkyl having from 1 to 20 carbon atoms, in which arbitrary methylene may be replaced by oxygen, fluoroaryl having from 6 to 20 carbon atoms, in which at least one hydrogen is replaced by fluorine or trifluoromethyl, or fluoroarylalkyl having from 7 to 20 carbon atoms, in which at least one hydrogen in an aryl moiety is replaced by fluorine or trifluoromethyl; and $L^1$ represents —$Y^1$—O—CO— (wherein $Y^1$ represents alkylene having from 2 to 10 carbon atoms bonded to Si), and $R^{10}$ represents hydrogen, alkyl having from 1 to 5 carbon atoms or aryl having from 6 to 10 carbon atoms; or $L^1$ represents —$Y^2$-Ph- (wherein $Y^2$ represents a single bond or alkylene having from 1 to 10 carbon atoms bonded to Si), and $R^{10}$ represents hydrogen.

[2] The polymer according to the item [1], wherein
in the formula (1), $R_f^1$ to $R_f^7$ each independently represent 3,3,3-trifluoropropyl, 3,3,4,4,4-pentafluorobutyl, 3,3,4,4,5,5,6,6-nonafluorohexyl, tridecafluoro-1,1,2,2-tetrahydrooctyl, heptadecafluoro-1,1,2,2-tetrahydrodecyl, heneicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl or α,α,α-trifluoromethylphenyl; and $L^1$ represents —$Y^1$—O—CO— (wherein $Y^1$ represents alkylene having from 2 to 10 carbon atoms bonded to Si), and $R^{10}$ represents hydrogen, alkyl having from 1 to 5 carbon atoms or aryl having from 6 to 10 carbon atoms; or $L^1$ represents —$Y^2$-Ph- (wherein $Y^2$ represents a single bond or alkylene having from 1 to 10 carbon atoms bonded to Si), and $R^{10}$ represents hydrogen.

[3] The polymer according to the item [1], wherein
in the formula (1), $R_f^1$ to $R_f^7$ each independently represent 3,3,3-trifluoropropyl, 3,3,4,4,5,5,6,6,6-nonafluorohexyl or tridecafluoro-1,1,2,2-tetrahydrooctyl;

$R^{10}$ represents hydrogen, alkyl having from 1 to 5 carbon atoms or aryl having from 6 to 10 carbon atoms; and $L^1$ represents a group represented by the formula (5) or (7):

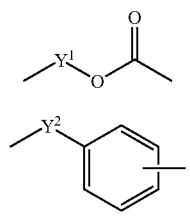

wherein
in the formula (5),
Y¹ represents alkylene having from 2 to 10, provided that Y¹ is bonded to Si, and carbonyl is bonded to C, and
in the formula (7)
Y² represents a single bond or alkylene having from 1 to 10 carbon atoms, provided that Y² is boded to Si, and phenyl is bonded to C.

[4] The polymer according to one of the items [1] to [3], wherein the polymer further contains a constitutional unit 2 represented by the formula (2):

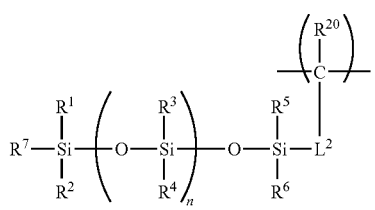

wherein
n represents an integer of from 1 to 1,000;
R¹ to R⁷ each independently represents hydrogen, alkyl, aryl or arylalkyl, provided that in the alkyl, aryl or arylalkyl, arbitrary hydrogen may be replaced by fluorine, and arbitrary —CH₂— may be replaced by —O— or cycloalkylene; and
L² represents —Y¹—O—CO— (wherein Y¹ represents alkylene having from 2 to 10 carbon atoms bonded to Si), and R²⁰ represents hydrogen, linear or branched alkyl having from 1 to 5 carbon atoms or aryl having from 6 to 10 carbon atoms;
L² represents —X¹—Y$_p$—O—CO— (wherein X¹ represents alkylene having from 2 to 20 carbon atoms bonded to Si; Y represents —OCH₂CH₂—, —OCHCH₃CH₂— or —OCH₂CH(CH₃)—; and p represents an integer of from 0 to 3), and R²⁰ represents hydrogen, alkyl having from 1 to 5 carbon atoms or aryl having from 6 to 10 carbon atoms; or
L² represents —Y²-Ph- (wherein Y² represents a single bond or alkylene having from 1 to 10 carbon atoms bonded to Si), and R²⁰ represents hydrogen.

[5] The polymer according to the item [4], wherein
in the formula (2),
R¹, R², R⁵, R⁶ and R⁷ each independently represent alkyl, in which arbitrary hydrogen may be replaced by fluorine, aryl, in which arbitrary hydrogen may be replaced by fluorine, or arylalkyl, in which arbitrary hydrogen may be replaced by fluorine;
R³ and R⁴ each independently represents hydrogen, phenyl or alkyl, in which arbitrary hydrogen may be replaced by fluorine; and
L² represents —Y¹—O—CO— (wherein Y¹ represents alkylene having from 2 to 10 carbon atoms bonded to Si), and R²⁰ represents hydrogen, linear or branched alkyl having from 1 to 5 carbon atoms or aryl having from 6 to 10 carbon atoms;
L² represents —X¹—Y$_p$—O—CO— (wherein X¹ represents alkylene having from 2 to 20 carbon atoms bonded to Si; Y represents —OCH₂CH₂—, —OCHCH₃CH₂— or —OCH₂CH(CH₃)—; and p represents an integer of from 0 to 3), and R²⁰ represents hydrogen, alkyl having from 1 to 5 carbon atoms or aryl having from 6 to 10 carbon atoms; or
L² represents —Y²-Ph- (wherein Y² represents a single bond or alkylene having from 1 to 10 carbon atoms bonded to Si), and R²⁰ represents hydrogen.

[6] The polymer according to the item [4], wherein
in the formula (2),
R¹, R², R⁵ and R⁶ each independently represents methyl or phenyl;
R³ and R⁴ each independently represents methyl, phenyl or 3,3,3-trifluoropropyl;
R⁷ represents methyl, ethyl, propyl, butyl, isobutyl, phenyl, 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, heneicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl or α,α,α-trifluoromethylphenyl;
R²⁰ represents hydrogen or alkyl having from 1 to 10 carbon atoms, in which hydrogen may be replaced by fluorine; and
L² represents a group represented by the formula (5), (6) or (7):

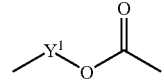

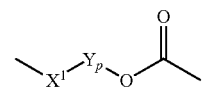

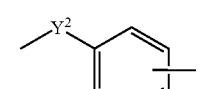

wherein
in the formula (5),
Y¹ represents alkylene having from 2 to 10 carbon atoms, provided that Y¹ is bonded to Si, and carbonyl is bonded to C,
in the formula (6),
X¹ represents alkylene having from 2 to 20 carbon atoms; Y represents —OCH₂CH₂—, —OCHCH₃CH₂— or —OCH₂CH(CH₃)—; and p represents an integer of from 0 to 3, provided that X¹ is bonded to Si, and carbonyl is bonded to C, and
in the formula (7),
Y² represents a single bond or alkylene having from 1 to 10 carbon atoms, provided that Y² is bonded to Si, and phenyl is bonded to C.

[7] The polymer according to one of the items [1] to [6], wherein the polymer further contain at least one selected from the group consisting of constitutional units derived from a (meth)acrylic acid derivative and a styrene derivative.

[8] A method for producing a polymer, the method containing: polymerizing a mixture containing at least a monomer 1M represented by the formula (1M):

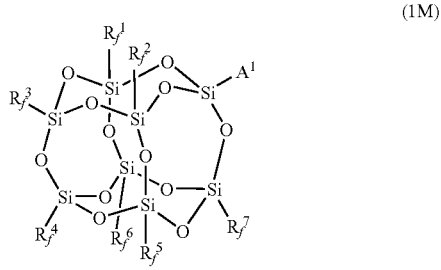

(1M)

wherein $R_f^1$ to $R_f^7$ each independently represent fluoroalkyl having from 1 to 20 carbon atoms, in which arbitrary methylene may be replaced by oxygen, fluoroaryl having from 6 to 20 carbon atoms, in which at least one hydrogen is replaced by fluorine or trifluoromethyl, or fluoroarylalkyl having from 7 to 20 carbon atoms, in which at least one hydrogen in an aryl moiety is replaced by fluorine or trifluoromethyl; and $A^1$ represents an addition polymerizable reactive group.

(8-1) The method for producing a polymer according to the item [8], wherein in the formula (1M), $A^1$ represents a radical polymerizable functional group.

(8-2) The method for producing a polymer according to the item [8], wherein in the formula (1M), $A^1$ represents a group containing (meth)acryl or styryl.

(8-3) The method for producing a polymer according to the item [8], wherein in the formula (1M), $A^1$ represents a group represented by the formula (5M) or (7M):

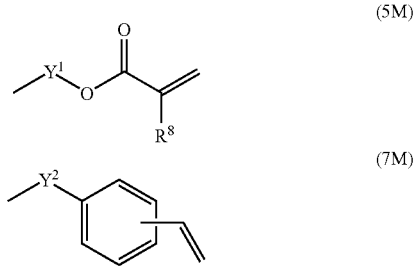

(5M)

(7M)

wherein in the formula (5M), $Y^1$ represents alkylene having from 2 to 10 carbon atoms; and $R^8$ represents hydrogen, alkyl having from 1 to 5 carbon atoms or aryl having from 6 to 10 carbon atoms, and in the formula (7M), $Y^2$ represents a single bond or alkylene having from 1 to 10 carbon atoms.

(8-4) The method for producing a polymer according to the item (8-3), wherein in the formula (5M), $Y^1$ represents alkylene having from 2 to 6 carbon atoms; and $R^8$ represents hydrogen or alkyl having from 2 to 6 carbon atoms, and in the formula (7M), $Y^2$ represents a single bond or alkylene having from 1 to 6 carbon atoms.

(8-5) The method for producing a polymer according to the item (8-3), wherein in the formula (5M), $Y^1$ represents propylene; and $R^8$ represents hydrogen or methyl, and in the formula (7M), $Y^2$ represents a single bond or alkylene having 1 or 2 carbon atoms.

[9] The method for producing a polymer according to the item [8], wherein the mixture further contains a monomer 2M represented by the formula (2M):

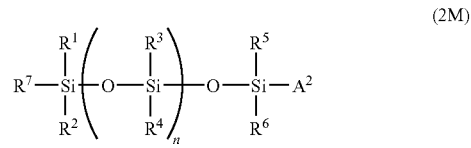

(2M)

wherein n represents an integer of from 1 to 1,000;

$R^1$ to $R^7$ each independently represents hydrogen, alkyl, aryl or arylalkyl, provided that in the alkyl, aryl or arylalkyl, arbitrary hydrogen may be replaced by fluorine, and arbitrary —$CH_2$— may be replaced by —O— or cycloalkylene; and $A^2$ represents an addition polymerizable reactive group.

The embodiments in the items (8-1) to (8-5) are included in the scope of the embodiment in the item [8].

[10] The method for producing a polymer according to the item [9], wherein in the formula (2M), $A^2$ represents a radical polymerizable functional group.

[11] The method for producing a polymer according to the item [9], wherein in the formula (2M), $A^2$ represents a group containing (meth)acryl or styryl.

[12] The method for producing a polymer according to the item [9], wherein in the formula (2M), $A^2$ represents a group represented by the formula (5M), (6M) or (7M):

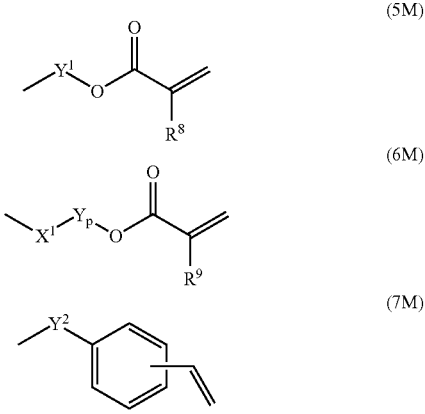

(5M)

(6M)

(7M)

wherein in the formula (5M), $Y^1$ represents alkylene having from 2 to 10 carbon atoms; and $R^8$ represents hydrogen, alkyl having from 1 to 5 carbon atoms or aryl having from 6 to 10 carbon atoms, in the formula (6M), $R^9$ represents hydrogen, alkyl having from 1 to 5 carbon atoms or aryl having from 6 to 10 carbon atoms;

$X^1$ represents alkylene having from 2 to 20 carbon atoms;

Y represents —OCH$_2$CH$_2$—, —OCHCH$_3$CH$_2$— or —OCH$_2$CH(CH$_3$)—; and p represents an integer of from 0 to 3, and in the formula (7M), Y$^2$ represents a single bond or alkylene having from 1 to 10 carbon atoms.

[13] The method for producing a polymer according to the item [12], wherein in the formula (5M), Y$^1$ represents alkylene having from 2 to 6 carbon atoms; and R$^8$ represents hydrogen or alkyl having from 2 to 6 carbon atoms, in the formula (6M), X$^1$ represents —CH$_2$CH$_2$CH$_2$—; and Y represents —OCH$_2$CH$_2$—, and in the formula (7M), Y$^2$ represents a single bond or alkylene having from 1 to 6 carbon atoms.

[14] The method for producing a polymer according to the item [12], wherein in the formula (5M), Y$^1$ represents propylene; and R$^8$ represents hydrogen or methyl, in the formula (6M), X$^1$ represents —CH$_2$CH$_2$CH$_2$—; and Y represents —OCH$_2$CH$_2$—, and in the formula (7M), Y$^2$ represents a single bond or alkylene having 1 or 2 carbon atoms.

[15] The method for producing a polymer according to one of the items [8] to [14], wherein the mixture further contains at least one selected from the group consisting of a (meth) acrylic acid derivative and a styrene derivative.

[16] The method for producing a polymer according to one of the items [8] to [15], wherein the mixture further contains at least one monomer selected from the group consisting of a monomer 3M represented by the formula (3M) and a monomer 4M represented by the formula (4M):

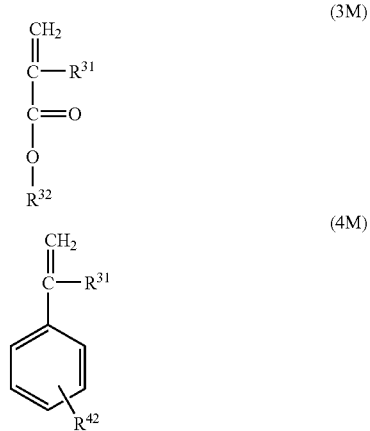

wherein in the formula (3M),

R$^{31}$ represents hydrogen, alkyl having from 1 to 30 carbon atoms, aryl having from 6 to 30 carbon atoms or arylalkyl having from 7 to 40 carbon atoms, provided that in the alkyl, aryl or arylalkyl, arbitrary hydrogen may be replaced by fluorine, and arbitrary —CH$_2$— may be replaced by —O— or cycloalkylene; and R$^{32}$ represents a group selected from a crosslinkable and non-crosslinkable group, and in the formula (4M), R$^{41}$ represents hydrogen, alkyl having from 1 to 30 carbon atoms, aryl having from 6 to 30 carbon atoms or arylalkyl having from 7 to 40 carbon atoms, provided that in the alkyl, aryl or arylalkyl, arbitrary hydrogen may be replaced by fluorine, and arbitrary —CH$_2$— may be replaced by —O— or cycloalkylene; and R$^{42}$ represents a group selected from a crosslinkable and non-crosslinkable group.

[17] The method for producing a polymer according to the item [16], wherein in the formula (3M), R$^{31}$ represents hydrogen, alkyl having from 1 to 10 carbon atoms, aryl having from 6 to 10 carbon atoms or arylalkyl having from 7 to 20 carbon atoms, provided that in the alkyl, aryl or arylalkyl, arbitrary hydrogen may be replaced by fluorine, and arbitrary —CH$_2$— may be replaced by —O—; and R$^{32}$ represents hydroxyl, a monovalent functional group containing a cyclic ether, halogenated alkyl, a group containing a group selected from blocked isocyanate, isocyanate, amino and carboxyl, hydrogen, alkyl having from 1 to 12 carbon atoms, aryl having from 6 to 10 carbon atoms or arylalkyl having from 7 to 20 carbon atoms, provided that in the alkyl, aryl or arylalkyl, arbitrary hydrogen may be replaced by fluorine, and arbitrary —CH$_2$— may be replaced by —O—, and in the formula (4M), R$^{41}$ represents hydrogen, alkyl having from 1 to 10 carbon atoms, aryl having from 6 to 10 carbon atoms or arylalkyl having from 7 to 20 carbon atoms, provided that in the alkyl, aryl or arylalkyl, arbitrary hydrogen may be replaced by fluorine, and arbitrary —CH$_2$— may be replaced by —O—; and R$^{42}$ represents hydroxyl, a monovalent functional group containing a cyclic ether, halogenated alkyl, a group containing a group selected from blocked isocyanate, isocyanate, amino and carboxyl, hydrogen or alkyl having from 1 to 10 carbon atoms, in which arbitrary hydrogen may be replaced by fluorine, and arbitrary —CH$_2$— may be replaced by —O—.

[18] A polymer produced by the method according to one of the items [8] to [17].

[19] A surface-treating agent containing the polymer according to one of the items [1] to [7] and [18].

[20] A water-repelling and oil-repelling treating agent containing the polymer according to one of the items [1] to [7] and [18].

[21] An antifouling treating agent containing the polymer according to one of the items [1] to [7] and [18].

[22] A charge controlling treating agent containing the polymer according to one of the items [1] to [7] and [18].

[23] An article treated with the treating agent according to one of the items [19] to [22].

In the invention, the alkyl having from 1 to 30 carbon atoms is preferably alkyl having from 1 to 20 carbon atoms, and more preferably alkyl having from 1 to 10 carbon atoms. Examples of the alkyl include methyl, ethyl, propyl, isopropyl, n-butyl, sec-butyl, tert-butyl, pentyl, hexyl and dodecanyl, by which the invention is not limited. The alkyl may be linear or branched.

The alkyl having from 1 to 5 carbon atoms may be linear or branched.

The alkylene having from 2 to 10 carbon atoms may be linear or branched.

In the invention, the aryl having from 6 to 30 carbon atoms is preferably aryl having from 6 to 20 carbon atoms, and more preferably aryl having from 6 to 10 carbon atoms. Examples of the aryl include phenyl, 1-naphthyl, 2-naphthyl, indenyl, biphenyl, terphenyl, anthryl and phenanthryl, by which the invention is not limited.

In the invention, the arylalkyl having from 7 to 40 carbon atoms is preferably arylalkyl having from 7 to 12 carbon atoms. Examples of the arylalkyl include benzyl, phenethyl, diphenylmethyl, triphenylmethyl, 1-naphthylmethyl, 2-naphthylmethyl, 2,2-diphenylethyl, 3-phenylpropyl, 4-phenylbutyl and 5-phenylpentyl, by which the invention is not limited.

In the invention, the term "addition polymerizable" means capability of undergoing addition polymerization, the term "addition polymerizable monomer" means a monomer capable of undergoing addition polymerization, and the term "addition polymerizable functional group" means a functional group capable of undergoing addition polymerization.

In the invention, the term "(meth)acrylic" is a generic term including acrylic and methacrylic and means acrylic and/or methacrylic. The rule is applied to such terms as "(meth)acrylate", "(meth)acryl" and the like.

A polymer according to the embodiments of the invention has excellent characteristics in such properties as water repellency, oil repellency, antifouling property and charge controlling property.

DESCRIPTION OF THE PREFERRED EMBODIMENTS

1. Polymer of the Invention

Figure 1:
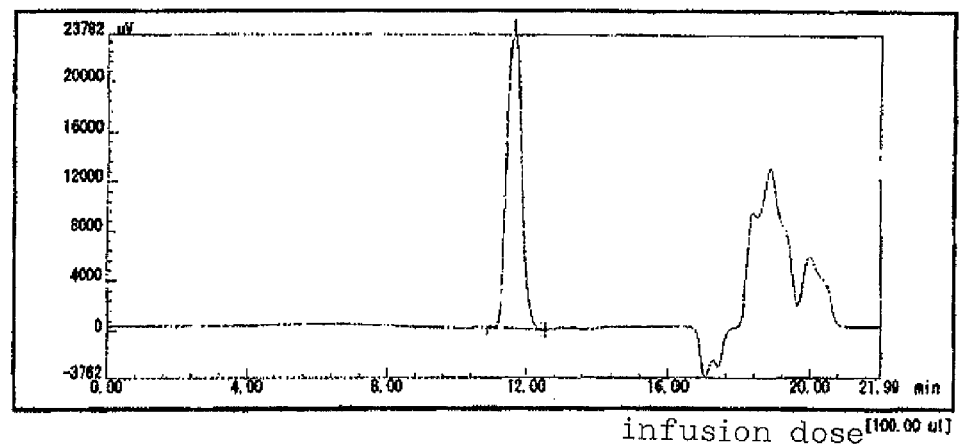
FIG. 1 is a diagram showing results of GPC measurement of the compound 1M-1 synthesized in Synthesis Example 1.

The polymer of the invention contains a constitutional unit 1 derived from fluorosilsesquioxane having an addition polymerizable group, or containing a structural unit 1 derived from fluorosilsesquioxane having an addition polymerizable group and a structural unit 2 derived from organopolysiloxane having an addition polymerizable group.

The polymer of the invention may be an ordered polymer, such as a block copolymer, or may be a random polymer, and is preferably a random polymer. The polymer of the invention may have a crosslinked structure and may be a graft polymer.

In the case where the polymer of the invention contains the constitutional unit 1 and the constitutional unite 2, the molar ratio of the constitutional unit 1 to the constitutional unit 2 may be appropriately determined depending on the target polymer, and is preferably approximately from 0.001/99.999 to 99.999/0.001, and more preferably from 0.1/99.9 to 99.9/0.1.

In the case where the polymer of the invention contains a constitutional unit 3 and a constitutional unit 4, which are arbitrary constitutional units, the molar ratio of the arbitrary constitutional units to the constitutional unit 1 is preferably approximately from 0.001/99.999 to 99.999/0.001, and the molar ratio of the arbitrary constitutional units to the constitutional unit 2 is preferably approximately from 0.001/99.999 to 99.999/0.001.

The weight average molecular weight of the copolymer varies depending on the structures of the constitutional units 1 and 2 and the contents thereof, and is preferably approximately from 1,000 to 1,000,000. The molecular weight distribution (Mw/Mn) of the polymer of the invention is generally approximately from 1.01 to 2.5, by which the invention is not limited.

The polymer of the invention preferably has a fluorine atom content of from 0.001 to 65% by weight.

1.1 Constitutional Unit 1 Derived from Fluorosilsesquioxane

The constitutional unit 1 derived from fluorosilsesquioxane is not particularly limited as far as it has the structure represented by the formula (1). In the formula (1), $R_f^1$ to $R_f^7$ each independently represent linear or branched fluoroalkyl having from 1 to 20 carbon atoms, in which arbitrary methylene may be replaced by oxygen, fluoroaryl having from 6 to 20 carbon atoms, in which at least one hydrogen is replaced by fluorine or trifluoromethyl, or fluoroarylalkyl having from 7 to 20 carbon atoms, in which at least one hydrogen in an aryl moiety is replaced by fluorine or trifluoromethyl; and $L^1$ represents —$Y^1$—O—CO— (wherein $Y^1$ represents alkylene having from 2 to 10 carbon atoms bonded to Si constituting the fluorosilsesquioxane skeleton), and $R^{10}$ represents hydrogen, alkyl having from 1 to 5 carbon atoms or aryl having from 6 to 10 carbon atoms; or $L^1$ represents —$Y^2$-Ph- (wherein $Y^2$ represents a single bond or alkylene having from 1 to 10 carbon atoms bonded to Si constituting the fluorosilsesquioxane skeleton), and $R^{10}$ represents hydrogen.

In the formula (1), all $R_f^1$ to $R_f^7$ each preferably represent fluoroalkyl, fluoroaryl or fluoroarylalkyl. The fluoroalkyl represented by $R_f^1$ to $R_f^7$ may be linear or branched fluoroalkyl.

The carbon number of the fluoroalkyl represented by $R_f^1$ to $R_f^7$ in the formula (1) is from 1 to 20, and preferably from 3 to 14. Arbitrary methylene in the fluoroalkyl may be replaced by oxygen. The term "methylene" herein includes —$CH_2$—, —CFH— and —$CF_2$—. In other words, the expression "arbitrary methylene may be replaced by oxygen" means that —$CH_2$—, —CFH— and —$CF_2$— may be replaced by oxygen. In a preferred embodiment, however, the fluoroalkyl does not contain two oxygen atoms bonded to each other (—O—O—). In a preferred embodiment of the fluoroalkyl, methylene adjacent to Si is not replaced by oxygen, and the terminal opposite to Si is $CF_3$. It is preferred that —$CF_2$— is replaced by oxygen rather than —$CH_2$— or —CFH—. Preferred examples of the fluoroalkyl include 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, heneicosafluoro-1,1,2,2-tetrahydrodecyl, pentacosafluoro-1,1,2,2-tetrahydrotetradecyl and (3-heptafluoroisopropoxy)propyl, and among these, perfluoroalkylethyl is particularly preferred.

The fluoroaryl represented by $R_f^1$ to $R_f^7$ is aryl, in which arbitrary at least one hydrogen is replaced by fluorine or trifluoromethyl, and the carbon number thereof is preferably from 6 to 20, and more preferably 6. Examples of the aryl include, phenyl and naphthyl, and also include heteroaryl. Specific examples thereof include fluorophenyl, such as pentafluorophenyl, and trifluoromethylphenyl.

The fluoroarylalkyl represented by $R_f^1$ to $R_f^7$ is alkyl containing aryl containing fluorine, and the carbon number thereof is preferably from 7 to 20, and more preferably from 7 to 10. Fluorine contained therein is preferably derived by replacing arbitrary at least one hydrogen in the aryl moiety thereof by fluorine or trifluoromethyl. Examples of the aryl moiety include phenyl and naphthyl, and also include heteroaryl, and examples of the alkyl moiety include methyl, ethyl and propyl.

$R_f^1$ to $R_f^7$ each preferably represent fluoroalkyl among fluoroalkyl, fluoroalyl and fluoroarylalkyl. In the fluoroalkyl, perfluoroalkylethyl is preferred, and 3,3,3-trifluoropropyl, 3,3,4,4,5,5,6,6,6-nonafluorohexyl and tridecafluoro-1,1,2,2-tetrahydrooctyl are more preferred.

In the formula (1), $L^1$ preferably represents a group represented by the formula (5) or (7).

In the formula (5), $Y^1$ represents alkylene having from 2 to 10, preferably alkylene having from 2 to 6 carbon atoms, and more preferably propylene. In the formula (5), $R^8$ represents hydrogen, linear or branched alkyl having from 1 to 5 carbon atoms or aryl having from 6 to 10 carbon atoms, preferably hydrogen or alkyl having 2 or 3 carbon atoms, and particularly preferably hydrogen or methyl. In the formula (5), $Y^1$ constituting one terminal of the group represented by the formula (5) is bonded to Si constituting the fluorosilsesquioxane skeleton, and carbonyl constituting the other terminal is bonded to C.

In the formula (7), $Y^2$ represents a single bond or alkylene having from 2 to 10 carbon atoms, preferably a single bond or alkylene having from 2 to 6, more preferably a single bond or alkylene having 1 or 2 carbon atoms, and particularly preferably a single bond or ethylene. The methylene moiety may be bonded to an arbitrary carbon atom of the benzene ring, and preferably bonded to a carbon atom at the p-position with respect to $Y^2$. In the formula (7), $Y^2$ constituting one terminal of the group represented by the formula (7) is bonded to Si constituting the fluorosilsesquioxane skeleton, and phenyl constituting the other terminal is bonded to C.

1.2 Constitutional Unit 2 Derived from Organopolysiloxane

The polymer of the invention may contain, in addition to the constitutional unit 1, a constitutional unit 2 derived from organopolysiloxane, such as polydimethylsiloxane. In the case where organopolysiloxane is grafted to an organic polymer side chain, the resulting polymer can exhibits characteristics that are peculiar to organopolysiloxane, such as water repellency, releasing property, sliding property, low friction property, antithrombogenic property, heat resistance, electric property, flexibility, oxygen permeability and radiation resistance.

The constitutional unit 2 derived from organopolysiloxane is not particularly limited as far as it has the structure represented by the formula (2). In the formula (2), n represents an integer of from 1 to 1,000; $R^1$ to $R^7$ each independently represents hydrogen, alkyl, aryl or arylalkyl, provided that in the alkyl, aryl or arylalkyl, arbitrary hydrogen may be replaced by fluorine, and arbitrary —$CH_2$— may be replaced by —O— or cycloalkylene; and $L^2$ and $R^{20}$ are in one of the following cases (i) to (iii):

(i) $L^2$ represents —$Y^1$—O—CO— (wherein $Y^1$ represents alkylene having from 2 to 10 carbon atoms bonded to Si constituting the organopolysiloxane skeleton), and $R^{20}$ represents hydrogen, linear or branched alkyl having from 1 to 5 carbon atoms or aryl having from 6 to 10 carbon atoms;

(ii) $L^2$ represents —$X^1$—$Y_p$—O—CO— (wherein $X^1$ represents alkylene having from 2 to 20 carbon atoms bonded to Si constituting the organopolysiloxane skeleton; Y represents —$OCH_2CH_2$—, —$OCHCH_3CH_2$— or —$OCH_2CH(CH_3)$—; and p represents an integer of from 0 to 3), and $R^{20}$ represents hydrogen, alkyl having from 1 to 5 carbon atoms or aryl having from 6 to 10 carbon atoms; and (iii) $L^2$ represents —$Y^2$-Ph- (wherein $Y^2$ represents a single bond or alkylene having from 1 to 10 carbon atoms bonded to Si constituting the organopolysiloxane skeleton), and $R^{20}$ represents hydrogen.

In the formula (2), it is preferred that $R^1$, $R^2$, $R^5$, $R^6$ and $R^7$ each independently represent alkyl, in which arbitrary hydrogen may be replaced by fluorine, aryl, in which arbitrary hydrogen may be replaced by fluorine, or arylalkyl, in which arbitrary hydrogen may be replaced by fluorine; and $R^3$ and $R^4$ each independently represents hydrogen, phenyl or alkyl, in which arbitrary hydrogen may be replaced by fluorine. It is more preferred that $R^1$, $R^2$, $R^5$ and $R^6$ each independently represents methyl or phenyl; $R^3$ and $R^4$ each independently represents methyl, phenyl or 3,3,3-trifluoropropyl; and $R^7$ represents methyl, ethyl, propyl, butyl, isobutyl, phenyl, 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, heneicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl or α,α,α-trifluoromethylphenyl.

In the formula (2), $L^1$ preferably represents a group represented by the formula (5), (6) or (7).

The formulae (5) and (7) are the same as in the definition of $L^1$ in the formula (1).

In the formula (6), $X^1$ represents alkylene having from 1 to 20 carbon atoms, and preferably —$CH_2CH_2CH_2$—; Y represents —$OCH_2CH_2$—$OCHCH_3CH_2$— or —$OCH_2CH(CH_3)$—, and preferably —$OCH_2CH_2$—; and p represents an integer of from 0 to 3, and preferably 0 or 1. In the formula (6), $X^1$ constituting one terminal of the group represented by the formula (6) is bonded to Si constituting the fluorosilsesquioxane skeleton, and carbonyl constituting the other terminal is bonded to C.

1.3 Arbitrary Constitutional Units Capable of Constituting Polymer of the Invention (Constitutional Units 3 and 4)

The polymer of the invention is not particularly limited as far as it contains the constitutional unit 1 or contains the constitutional unit 1 and the constitutional unit 2, and may further contain a constitutional unit 3 represented by the formula (3) and a constitutional unit 4 represented by the formula (4) for controlling various properties of the resulting polymer, such as the water repellency, the oil repellency, the antifouling property, the charge controlling property, the solubility in a solvent, the hardness and the tactile impression, and the compatibility with a resin and the leveling property of the polymer.

(3)

(4)

(1) Constitutional Unit 3

The constitutional unit 3 is not particularly limited as far as it is represented by the formula (3). In the formula (3), $R^{31}$ represents alkyl having from 1 to 30 carbon atoms, aryl having from 6 to 30 carbon atoms or arylalkyl having from 7 to 40 carbon atoms, provided that in the alkyl, aryl and arylalkyl, arbitrary hydrogen may be replaced by fluorine, and arbitrary —$CH_2$— may be replaced by —O— or cycloalkylene; and $R^{32}$ represents a group selected from a crosslinkable and non-crosslinkable group.

In the formula (3), it is preferred that $R^{31}$ represents hydrogen, alkyl having from 1 to 10 carbon atoms, aryl having from 6 to 10 carbon atoms or arylalkyl having from 7 to 20 carbon atoms, provided that in the alkyl, aryl or arylalkyl, arbitrary hydrogen may be replaced by fluorine, and arbitrary —$CH_2$— may be replaced by —O—; and $R^{32}$ represents hydroxyl, a monovalent functional group containing a cyclic ether, halogenated alkyl, a group containing a group selected from blocked isocyanate, isocyanate, amino and carboxyl, hydrogen, alkyl having from 1 to 12 carbon atoms, aryl having from 6 to 10 carbon atoms or arylalkyl having from 7 to 20 carbon atoms, provided that in the alkyl, aryl or arylalkyl, arbitrary hydrogen may be replaced by fluorine, and arbitrary —$CH_2$— may be replaced by —O—.

(2) Constitutional Unit 4

The constitutional unit 4 is not particularly limited as far as it is represented by the formula (4). In the formula (4), $R^{41}$ represents hydrogen, alkyl having from 1 to 30 carbon atoms, aryl having from 6 to 30 carbon atoms or arylalkyl having from 7 to 40 carbon atoms, provided that in the alkyl, aryl or arylalkyl, arbitrary hydrogen may be replaced by fluorine, and arbitrary —$CH_2$— may be replaced by —O— or cycloalkylene; and $R^{42}$ represents a group selected from a crosslinkable and non-crosslinkable group.

In the formula (4), it is preferred that $R^{41}$ represents hydrogen, alkyl having from 1 to 10 carbon atoms, aryl having from 6 to 10 carbon atoms or arylalkyl having from 7 to 20 carbon atoms, provided that in the alkyl, aryl or arylalkyl, arbitrary hydrogen may be replaced by fluorine, and arbitrary —$CH_2$— may be replaced by —O—; and $R^{42}$ represents hydroxyl, a monovalent functional group containing a cyclic ether, halogenated alkyl, a group containing a group selected from blocked isocyanate, isocyanate, amino and carboxyl, hydrogen or alkyl having from 1 to 10 carbon atoms, in which arbitrary hydrogen may be replaced by fluorine, and arbitrary —$CH_2$— may be replaced by —O—.

2. Production Method of the Polymer of the Invention

The polymer of the invention is a polymer containing the constitutional unit 1 or a polymer containing the constitutional unit 1 and the constitutional unit 2, and the production method therefor is not particularly limited. The polymer of the invention can be produced, for example, by a method of polymerizing a monomer 1M corresponding to the constitutional unit 1, or a method of polymerizing the monomer 1M and a monomer 2M corresponding to the constitutional unit 2.

2.1 Monomer 1M

The monomer 1M is a compound represented by the formula (1M). In the formula (1M), $R_f^1$ to $R_f^7$ each independently represent fluoroalkyl having from 1 to 20 carbon atoms, in which arbitrary methylene may be replaced by oxygen, fluoroaryl having from 6 to 20 carbon atoms, in which at least one hydrogen is replaced by fluorine or trifluoromethyl, or fluoroarylalkyl having from 7 to 20 carbon atoms, in which at least one hydrogen in an aryl moiety is replaced by fluorine or trifluoromethyl; and $A^1$ represents an addition polymerizable reactive group. The fluoroalkyl represented by $R_f^1$ to $R_f^7$ may be linear or branched.

Preferred embodiments, specific examples and the like of $R_f^1$ to $R_f^7$ in the formula (1M) are the same as those of $R_f^1$ to $R_f^7$ in the formula (1).

The addition polymerizable functional group $A^1$ contained in the monomer 1M is not particularly limited as far as it is a functional group that has addition polymerizability. Examples of the addition polymerizable functional group $A^1$ include a group having a terminal olefin type or internal olefin type radical polymerizable functional group; a group having a cationic polymerizable functional group, such as vinyl ether and propenyl ether; and a group having an anionic polymerizable functional group, such as vinylcarboxyl and cyanoacryloyl, and among these, a group having a radical polymerizable functional group is preferred.

The radical polymerizable functional group is not particularly limited as far as it is a group having radical polymerizability. Examples thereof include methacryloyl, acryloyl, allyl, styryl, α-methylstyryl, vinyl, vinyl ether, vinyl ester, acrylamide, methacrylamide, N-vinylamide, maleate ester, fumarate ester and N-substituted maleimide, and among these, a group containing (meth)acryl or styryl is preferred.

Examples of the radical polymerizable functional group having (meth)acryl include groups represented by the formula (5M). Preferred embodiments, specific examples and the like of $Y^1$ in the formula (5M) are the same as those of $Y^1$ in the formula (5).

Examples of the addition polymerizable reactive group $A^1$ contained in the monomer 1M include groups represented by the formula (7M), in addition to the groups represented by the formula (5M). Preferred embodiments, specific examples and the like of $Y^2$ in the formula (7M) are the same as those of $Y^2$ in the formula (7).

2.2 Monomer 2M

In the production method of a polymer of the invention, a monomer 2M, which is organopolysiloxane, may be polymerized along with the monomer 1M. In the case where organopolysiloxane is grafted to an organic polymer side chain, the resulting polymer can exhibits characteristics that are peculiar to organopolysiloxane, such as water repellency, releasing property, sliding property, low friction property, antithrombogenic property, heat resistance, electric property, flexibility, oxygen permeability and radiation resistance.

The monomer 2M is a compound represented by the formula (2M). In the formula (2M), n represents an integer of from 1 to 1,000; $R^1$ to $R^7$ each independently represents hydrogen, alkyl, aryl or arylalkyl, provided that in the alkyl, aryl or arylalkyl, arbitrary hydrogen may be replaced by fluorine, and arbitrary —$CH_2$— may be replaced by —O— or cycloalkylene; and $A^2$ represents an addition polymerizable reactive group.

Preferred embodiments, specific examples and the like of $R^1$ to $R^7$ and n in the formula (2M) are the same as those of $R^1$ to $R^7$ and n in the formula (2), respectively.

The addition polymerizable reactive group $A^2$ contained in the monomer 2M is not particularly limited as far as it is a functional group that has addition polymerizability. The addition polymerizable reactive group $A^2$ is preferably a radical polymerizable functional group, and more preferably a group containing (meth)acryl or styryl. Specific examples of the addition polymerizable reactive group $A^2$ include groups represented by the formulae (5M) to (7M). Preferred embodiments, specific examples and the like of $Y^1$ in the formula (5M), $X^1$, Y and p in the formula (6M) and $Y^2$ in the formula (7) are the same as those of $Y^1$ in the formula (5M), $X^1$, Y and p in the formula (6M) and $Y^2$ in the formula (7), respectively.

2.3 Arbitrary Monomers Capable of Being Used in Production Method of Polymer of the Invention (Monomers 3M and 4M)

The production method of a polymer of the invention is not particularly limited as far as it contains polymerization of the monomer 1M or polymerization of the monomer 1M and the monomer 2M, in which a monomer 3M, a monomer 4M and other monomers may be polymerized for controlling various properties of the resulting polymer, such as the water repellency, the oil repellency, the antifouling property, the charge controlling property, the solubility in a solvent, the hardness and the tactile impression, and the compatibility with a resin and the leveling property of the polymer. The monomers each may be a combination of two or more kinds thereof.

(1) Monomer 3M

The monomer 3M is a (meth)acrylic acid compound represented by the formula (3M). In the formula (3M), $R^{31}$ represents alkyl having from 1 to 30 carbon atoms, aryl having from 6 to 30 carbon atoms or arylalkyl having from 7 to 40 carbon atoms, provided that in the alkyl, aryl or arylalkyl, arbitrary hydrogen may be replaced by fluorine, and arbitrary —$CH_2$— may be replaced by —O— or cycloalkylene; and $R^{32}$ represents a group selected from a crosslinkable and non-crosslinkable group.

Preferred embodiments, specific examples and the like of $R^{31}$ and $R^{32}$ in the formula (3M) are the same as those of $R^{31}$ and $R^{32}$ in the formula (3), respectively.

Specific examples of the (meth)acrylic acid compound include an alkyl (meth)acrylate, such as methyl (meth)acrylate, ethyl (meth)acrylate, n-propyl (meth)acrylate, isopropyl (meth)acrylate, butyl (meth)acrylate isobutyl (meth)acrylate, t-butyl (meth)acrylate, n-pentyl (meth)acrylate, n-hexyl (meth)acrylate cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate and stearyl (meth)acrylate; an aryl (meth)acrylate, such as phenyl (meth)acrylate and toluoyl (meth)acrylate; arylalkyl (meth)acrylate such as benzyl (meth)acrylate; an alkoxyalkyl (meth)acrylate, such as 2-methoxyethyl (meth)acrylate, 3-methoxypropyl (meth)acrylate and 3-methoxybutyl (meth)acrylate; and an ethylene oxide adduct of (meth)acrylic acid.

Examples of the (meth)acrylic acid compound that has one addition polymerizable double bond include a (meth)acrylic acid compound having a silsesquioxane skeleton. Specific examples of the (meth)acrylic acid compound having a silsesquioxane skeleton include 3-(3,5,7,9,11,13,15-heptaethyl-pentacyclo [9.5.1.1$^{3,9}$.1$^{5,15}$.1$^{7,13}$]octasiloxan-1-yl)propyl (meth)acrylate, 3-(3,5,7,9,11,13,15-heptaisobutyl-pentacyclo [9.5.1.1$^{3,9}$.1$^{5,15}$.1$^{7,13}$]octasiloxan-1-yl)propyl (meth)acrylate, 3-(3,5,7,9,11,13,15-heptaisooctyl-pentacyclo [9.5.1.1$^{3,9}$.1$^{5,15}$.1$^{7,13}$]octasiloxan-1-yl)propyl (meth)acrylate, 3-(3,5,7,9,11,13,15-hptacyclopentyl-pentacyclo [9.5.1.1$^{3,9}$.1$^{5,15}$.1$^{7,13}$]octasiloxan-1-yl)propyl (meth)acrylate, 3-(3,5,7,9,11,13,15-heptaphenyl-pentacyclo [9.5.1.1$^{3,9}$.1$^{5,15}$.1$^{7,13}$]octasiloxan-1-yl)propyl (meth)acrylate, 3-[(3,5,7,9,11,13,15-heptaethyl-pentacyclo [9.5.1.1$^{3,9}$.1$^{5,15}$.1$^{7,13}$]octasiloxan-1-yloxy)-dimethylsilyl]propyl (meth)acrylate, 3-[(3,5,7,9,11,13,15-heptaisobutyl-pentacyclo [9.5.1.1$^{3,9}$.1$^{5,15}$.1$^{7,13}$]octasiloxan-1-yloxy)-dimethylsilyl) propyl (meth)acrylate, 3-[(3,5,7,9,11,13,15-heptaisooctyl-pentacyclo [9.5.1.1$^{3,9}$.1$^{5,15}$.1$^{7,13}$]octasiloxan-1-yloxy)-dimethylsilyl)propyl (meth)acrylate, 3-[(3,5,7,9,11,13,15-heptacyclopentyl-pentacyclo [9.5.1.1$^{3,9}$.1$^{5,15}$.1$^{7,13}$] octasiloxan-1-yloxy)-dimethylsilyl)propyl (meth)acrylate and 3-[(3,5,7,9,11,13,15-heptaphenyl-pentacyclo [9.5.1.1$^{3,9}$.1$^{5,15}$.1$^{7,13}$]octasiloxan-1-yloxy)-dimethylsilyl]propyl (meth)acrylate.

The monomer 3M that is a (meth) acrylic acid compound may contain fluorine.

Examples of the monomer 3M containing fluorine include a fluoroalkyl (meth)acrylate and a fluorine-containing polyether compound. Examples of the addition polymerizable monomer containing a fluorine atom include monomers disclosed in JP-A-10-251352, JP-A-2004-043671, JP-A-2004-155847, JP-A-2005-029743, JP-A-2006-117742, JP-A-2006-299016 and JP-A-2005-350560.

Examples of the monomer 3M that may contain fluorine include 2,2,2-trifluoroethyl (meth)acrylate, 2,2,3,3-tetrafluoro-n-propyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,4,4-hexafluorobutyl (meth)acrylate, 2,2,2,2',2',2'-hexafluoroisopropyl (meth)acrylate, 2,2,3,3,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluoro (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoro-undecyl (meth)acrylate, 3,3,4,4,5,5,6,6,7,7,8,8,9,9,10,10,11,11,11-nonadecafluoro-undecyl (meth)acrylate and 3,3,4,4,5,5,6,6,7,7,8,8,9,9,10,10,11,11,12,12-eicosafluoro dodecyl (meth)acrylate.

Specific examples of the fluorine-containing polyether compound include 1H,1H-perfluoro-3,6-dioxaheptyl (meth)acrylate, 1H,1H-perfluoro-3,6-dioxaoctyl (meth)acrylate, 1H,1H-perfluoro-3,6-dioxadecanyl (meth)acrylate, 1H,1H-perfluoro-3,6,9-trioxadecanyl (meth)acrylate, 1H,1H-perfluoro-3,6,9-trioxaundecanyl (meth)acrylate, 1H,1H-perfluoro-3,6,9-trioxamidecanyl (meth)acrylate, 1H,1H-perfluoro-3,6,9,12-tetraoxamidecanyl (meth)acrylate, 1H,1H-perfluoro-3,6,9,12-tetraoxatetradecanyl (meth)acrylate, 1H,1H-perfluoro-3,6,9,12-tetraoxahexadecanyl (meth)acrylate, 1H,1H-perfluoro-3,6,9,12,15-pentaoxahexadecanyl (meth)acrylate, 1H,1H-perfluoro-3,6,9,12,15-pentaoxaheptadecanyl (meth)acrylate, 1H,1H-perfluoro-3,6,9,12,15-pentaoxanonadecanyl (meth)acrylate, 1H,1H-perfluoro-3,6,9,12,15,18-hexaoxaeicosanyl (meth)acrylate, 1H,1H-perfluoro-3,6,9,12,15,18-hexaoxadocosanyl (meth)acrylate, 1H,1H-perfluoro-3,6,9,12,15,18,21-heptaoxatricosanyl (meth)acrylate and 1H,1H-perfluoro-3,6,9,12,15,18,21-heptaoxapentacosanyl (meth)acrylate.

The addition polymerizable monomer having a fluorine atom can be synthesized, for example, by reacting a fluorine compound having a hydroxyl group with an acid halide having an addition polymerizable functional group. Examples of the fluorine compound having a hydroxyl group include (HO) $C(CF_3)_2CH_3$, $(HO)C(CF_3)_2CH_2CH_3$, a compound having a $(HO)C(CF_3)_2CH_2O$—$CH_2$— group and $(HO)C(CF_3)_2$ $CH_2CH_2O$—$CH_3$. The fluorine compound having a hydroxyl group can be obtained by synthesis, and the synthesis method therefor is disclosed, for example, in JP-A-10-147639.

The addition polymerizable monomer having a fluorine atom is also available from Exfluor Research Corporation, and the commercially available products may be used.

The monomer 3M that is a (meth) acrylic acid compound may be an addition polymerizable monomer that has a crosslinkable functional group. The addition polymerizable monomer having a crosslinkable functional group may be a compound having one addition polymerizable double bond or a compound having two or more addition polymerizable double bonds, for example, the addition polymerizable monomer may be any of a vinyl compound, a vinylidene compound and a vinylene compound, and specific examples thereof include a (meth)acrylic acid derivative and a styrene derivative. Examples of the (meth)acrylic acid derivative include (meth)acrylic acid and (meth)acrylate ester, and also include (meth)acrylic acid amide and (meth) acrylonitrile.

The crosslinkable functional group can be selected from functional groups that can crosslink with other components in a composition containing the polymer of the invention and the other components. The monomer 3M may contain one crosslinkable functional group or two or more crosslinkable functional groups. Examples of the crosslinkable functional group include a monofunctional group containing epoxy, such as glycidyl and epoxycyclohexyl, cyclic ether, such as oxetanyl, or the like, isocyanate, acid anhydride, carboxyl, amine, halogenated alkyl, thiol, siloxy and hydroxyl.

Examples of the monomer 3M having a crosslinkable functional group include (meth)acrylic acid, a hydroxyalkyl (meth)acrylate, such as 2-hydroxyethyl (meth)acrylate, 2-hydroxypropyl (meth)acrylate; an epoxy-containing (meth)acrylate, such as glycidyl (meth)acrylate; an alicyclic epoxy-containing (meth)acrylate, such as 3,4-epoxycyclohexylmethyl (meth)acrylate; an oxetanyl-containing (meth)acrylate, such as 3-ethyl-3-(meth)acryloyloxymethyloxetane; 2-(meth)acryloyloxyethylisocyanate; γ-(methacryloyloxypropyl)trimethoxysilane; (meth)acrylate-2-aminoethyl; 2-(2-bromopropionyloxy)ethyl (meth)acrylate, 2-(2-bromoisobutylyloxy)ethyl (meth)acrylate; 1-(meth)acryloxy-2-phenyl-2-(2,2,6,6-tetra-methyl-1-piperidinyloxy)ethane; 1-(4-((4-(meth)acryloxy)-ethoxyethyl)phenylethoxy)piperidine, 1,2,2,6,6-pentamethyl-4-piperidyl (meth)acrylate and 2,2,6,6-pentamethyl-4-piperidyl (meth)acrylate.

(2) Monomer 4M

The monomer 4M is a styrene compound represented by the formula (4M). In the formula (4M), $R^{41}$ represents alkyl having from 1 to 30 carbon atoms, aryl having from 6 to 30 carbon atoms or arylalkyl having from 7 to 40 carbon atoms, provided that in the alkyl, aryl or arylalkyl, arbitrary hydrogen may be replaced by fluorine, and arbitrary —$CH_2$— may be replaced by —O— or cycloalkylene; and $R^{42}$ represents a group selected from a crosslinkable and non-crosslinkable group.

Preferred embodiments, specific examples and the like of $R^{41}$ and $R^{42}$ in the formula (4M) are the same as those of $R^{41}$ and $R^{42}$ in the formula (4M), respectively.

Specific examples of the styrene compound include styrene, vinyltoluene, α-methylstyrene and p-chlorostyrene.

Examples of the styrene compound that has one addition polymerizable double bond include a styrene compound having silsesquioxane. Examples of the styrene compound having silsesquioxane include an octasiloxane having a 4-biphenyl group ($T_8$ type silsesquioxane), such as 1-(4-vinylphenyl)-3,5,7,9,11,13,15-heptaethyl-pentacyclo[9.5.1.$1^{3,9}.1^{5,15}.1^{7,13}$]octasiloxane, 1-(4-vinylphenyl)-3,5,7,9,11,13,15-heptaisobutyl-pentacyclo[9.5.1.$1^{3,9}.1^{5,15}.1^{7,13}$]octasiloxane, 1-(4-vinylphenyl)-3,5,7,9,11,13,15-heptaisooctyl-pentacyclo[9.5.1.$1^{3,9}.1^{5,15}.1^{7,13}$]octasiloxane, 1-(4-vinylphenyl)-3,5,7,9,11,13,15-heptacyclopenthyl-pentacyclo [9.5.1.$1^{3,9}.1^{5,15}.1^{7,13}$]octasiloxane and 1-(4-vinylphenyl)-3,5,7,9,11,13,15-heptaphenyl-pentacyclo [9.5.1.$1^{3,9}.1^{5,15}.1^{7,13}$]octasiloxane; and an octasiloxane having a 4-vinylphenylethyl group ($T_8$ type silsesquioxane), such as 3-(3,5,7,9,11,13,15-heptaethyl-pentacyclo[9.5.1.$1^{3,9}.1^{5,15}.1^{7,13}$]octasiloxan-1-yl)-ethylstyrene, 3-(3,5,7,9,11,13,15-heptaisobutyl-pentacyclo[9.5.1.$1^{3,9}.1^{5,15}.1^{7,13}$]octasiloxan-1-yl)-ethylstyrene, 3-(3,5,7,9,11,13,15-heptaisooctyl-pentacyclo [9.5.1.$1^{3,9}.1^{5,15}.1^{7,13}$]octasiloxan-1-yl)ethylstyrene, 3-(3,5,7,9,11,13,15-heptacyclopentyl-pentacyclo[9.5.1.$1^{3,9}.1^{5,15}.1^{7,13}$]octasiloxan-1-yl)-ethylstyrene, 3-(3,5,7,9,11,13,15-heptaphenyl-pentacyclo [9.5.1.$1^{3,9}.1^{5,15}.1^{7,13}$]octasiloxan-1-yl)-ethylstyrene, 3-((3,5,7,9,11,13,15-heptaethyl-pentacyclo [9.5.1.$1^{3,9}.1^{5,15}.1^{7,13}$]octasiloxan-1-yloxy)-dimethylsilyl)ethylstyrene, 3-((3,5,7,9,11,13,15-heptaisobutyl-pentacyclo [9.5.1.$1^{3,9}.1^{5,15}.1^{7,13}$]octasiloxan-1-yloxy)-dimethylsilyl) ethylstyrene, 3-((3,5,7,9,11,13,15-heptaisooctyl-pentacyclo[9.5.1.$1^{3,9}.1^{5,15}.1^{7,13}$]octasiloxan-1-yloxy)-dimethylsilyl)ethylstyrene, 3-((3,5,7,9,11,13,15-heptacyclopentyl-pentacyclo[9.5.1.$1^{3,9}.1^{5,15}.1^{7,13}$] octasiloxan-1-yloxy)-dimethylsilyl)ethylstyrene and 3-((3,5,7,9,11,13,15-heptaphenyl-pentacyclo[9.5.1.$1^{3,9}.1^{5,15}.1^{7,13}$] octasiloxan-1-yloxy)-dimethylsilyl)ethylstyrene.

The monomer 4M that is a styrene compound may contain fluorine.

Examples of the monomer 3M containing a fluorine atom include fluorostyrene. The addition polymerizable monomer having a fluorine atom include monomers disclosed in JP-A-10-251352, JP-A-2004-155847 and JP-A-2006-299016.

Examples of the monomer 4M that may contain fluorine include a fluoroalkylstyrene, such as p-trifluoromethylstyrene, p-heptafluoropropylstyrene and p-pentafluoroethylstyrene.

The addition polymerizable monomer having a fluorine atom can be synthesized in the similar manner as in the synthesis of the monomer 3M and is also commercially available.

The monomer 4M as the styrene compound may be an addition polymerizable monomer that has a crosslinkable functional group, as similar to the monomer 3M.

Examples of the monomer 4M having a crosslinkable functional group include o-aminostyrene, p-styrenechlorosulfonic acid, styrenesulfonic acid and a salt thereof, vinylphenylmethyldithiocarbamate, 2-(2-bromopropionyloxy)styrene, 2-(2-bromoisobutyryloxy)styrene and 1-(2-((4-vinylphenyl)-methoxy)-1-phenylethoxy)2,2,6,6-tetramethylpiperidine.

Examples of the styrene derivative include compounds represented by the following formulae.

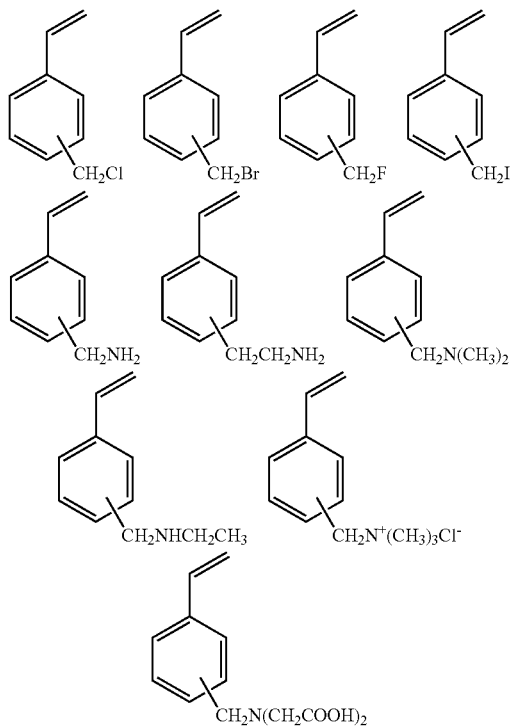

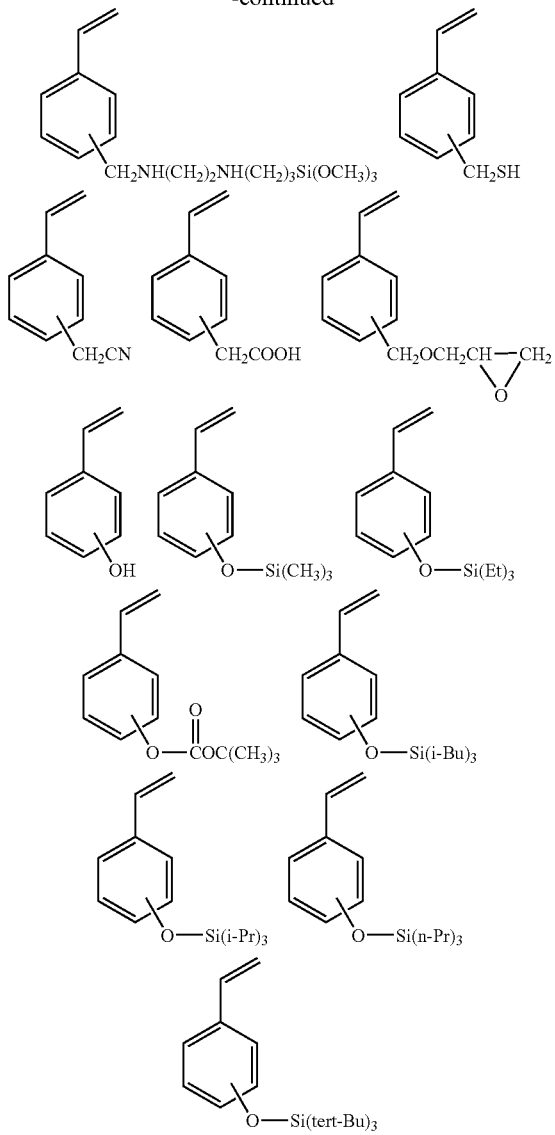

(3) Other Monomers

Examples of the other monomers that can be polymerized for providing the polymer of the invention include a compound having two or more addition polymerizable double bonds, which may be included in the monomer 3M or 4M in some cases.

Examples of the compound having two addition polymerizable double bonds include a di (meth)acrylate monomer, such as 1,3-butanediol di(meth)acrylate, 1,4-butanediol di(meth)acrylate, 1,6-hexanediol di(meth)acrylate, polyethylene glycol di(meth)acrylate, diethylene glycol di(meth)acrylate, neopentyl glycol di(meth)acrylate, triethylene glycol di(meth)acrylate, tripropylene glycol di(meth)acrylate, neopentyl glycol hydroxypivalic acid ester di(meth)acrylate, trimethylolpropane di(meth)acrylate, bis((meth)acryloyloxyethoxy)bisphenol A, bis((meth)acryloyloxyethoxy)tetrabromobisphenol A, bis((meth)acryloxypolyethoxy)bisphenol A, 1,3-bis(hydroxyethyl)-5,5-dimethylhydantoin, 3-methylpentanediol di(meth)acrylate, a di(meth)acrylate of a neopentyl glycol hydroxypivalic acid ester compound and bis((meth)acryloyloxypropyl)tetramethyldisiloxane; and divinylbenzene.

Examples of the compound having three or more addition polymerizable double bonds include trimethylolpropane tri(meth)acrylate, pentaerythritol tri(meth)acrylate, pentaerythritol tetra(meth)acrylate, dipentaerythritol monohydroxypenta(meth)acrylate, tris(2-hydroxyethylisocyanate) tri(meth)acrylate, tris(diethylene glycol)trimerate tri(meth)acrylate, 3,7,14-tris(((meth)acryloyloxypropyl)dimethylsiloxy)-1,3,5,7,9,11,14-heptaethyl-tricyclo[7.3.3.1$^{5,11}$]heptasiloxane, 3,7,14-tris((((meth)acryloyloxypropyl)dimethyl-siloxy)-1,3,5,7,9,11,14-heptaisobutyl-tricyclo[7.3.3.1$^{5,11}$]heptasiloxane, 3,7,14-tris((((meth)acryloyloxypropyl)dimethyl-siloxy)-1,3,5,7,9,11,14-heptaisooctyl-tricyclo[7.3.3.1$^{5,11}$]heptasiloxane, 3,7,14-tris((((meth)acryloyloxypropyl)dimethyl-siloxy)-1,3,5,7,9,11,14-heptacyclopentyl-tricyclo[7.3.3.1$^{5,11}$]heptasiloxane, 3,7,14-tris((((meth)acryloyloxypropyl)dimethyl-siloxy)-1,3,5,7,9,11,14-heptaphenyl-tricyclo[7.3.3.1$^{5,11}$]heptasiloxane, octakis(3-(meth)acryloyloxypropyldimethylsiloxy)-octasilsesquioxane and octakis(3-(meth)acryloyloxypropyl)-octasilsesquioxane.

2.4 Polymerization Method

The production method of the polymer of the invention may be a method of addition-polymerizing the monomer 1M, and arbitrary the monomer 2M and the other arbitrary monomers. The addition polymerization may be performed by using a polymerization initiator. The polymerization initiator is not particularly limited, and examples thereof include a radical polymerization initiator, such as an azo compound, e.g., 2,2'-azobisisobutyronitrile, 2,2'-azobis(2,4-dimethylvaleronitrile), 2,2'-azobis(2-butyronitrile), dimethyl-2,2'-azobisisobutyrate and 1,1'-azobis(cyclohexane-1-carbonitrile); a peroxide, e.g., benzoyl peroxide, lauryl peroxide, octanoyl peroxide, acetyl peroxide, di-t-butyl peroxide, t-butylcumyl peroxide, dicumyl peroxide, t-butyl peroxyacetate, t-butyl peroxybenzoate and t-butyl peroxyneodecanoate; and a dithiocarbamate, e.g., tetraethylthiramdisulfide.

The polymerization reaction employed in the addition polymerization in the production method of the invention is not particularly limited, and for example, living radical polymerization and active energy ray polymerization may be employed.

Representative examples of the living radical polymerization in the polymerization reaction in the invention include atom transfer radical polymerization, reversible addition cleavage chain transfer, iodine transfer polymerization and iniferter polymerization, and the polymerization reaction may be performed with polymerization initiators disclosed in "Radical Jugo Handbook" (Radical Polymerization Handbook), edited by K. Kamachi and T. Endo, published by NTS, Inc., Japan, Aug. 10, 1999, "Handbook of Radical Polymerization", edited by K. Matyjaszewski and T. P. Davis, published by John Wiley and Sons, Canada 2002, and JP-A-2005-105265.

The active energy ray polymerization in the addition polymerization in the production method of the invention may be performed with compounds disclosed in "Kanko Zairyo Listbook" (Photosensitive Materials Listbook), edited by Technical Association of Photopolymers, Japan Mar. 31, 1996, as an active energy ray polymerization initiator.

The active energy ray referred herein is an energy ray that is capable of decomposing a compound generating an active species to generate an active species. Examples of the active energy ray include a light energy ray, such as a visible ray, an ultraviolet ray, an infrared ray, an X-ray, an α-ray, a β-ray, a γ-ray, and an electron beam.

The active energy ray polymerization initiator capable of being used in the active energy ray polymerization reaction is not particularly limited as far as it is a compound that generates a radical upon irradiation with an ultraviolet ray, a visible ray or the like. Examples of the compound used as the active energy ray polymerization initiator include benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropiopenone, 2-hydroxy-2-methyl-4'-isopropylpropiophenone, 1-hydroxycyclohexyl phenyl ketone, isopropyl benzoin ether, isobutyl benzoin ether, 2,2-diethoxyacetophenone, 2,2-dimethoxy-2-phenylacetophenone, camphorquinone, benzanthrone, 2-methyl-1-(4-(methylthio)phenyl)-2-morpholinopropan-1-one, ethyl 2-benzyl-2-dimethylamino-1-(4-morpholinophenyl)-butanon-1,4-dimethylaminobenzoate, isoamyl 4-dimethylaminobenzoate, 4,4'-di(t-butylperoxycarbonyl) benzophenone, 3,4,4'-tri(t-butylperoxycarbonyl)benzophenone, 2,4,6-trimethylbenzoyldiphenylphosphine oxide, 2-(4'-methoxystyryl)-4,6-bis(trichloromethyl)-s-triazine, 2-(3',4'-dimethoxystyryl)-4,6-bis(trichloro-methyl)-s-triazine, 2-(2',4'-dimethoxystyryl)-4,6-bis(trichloro-methyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-(p-N,N-di(ethoxycarbonylmethyl))-2,6-di(trichloro-methyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl) benzoxazole, 2-(p-dimethylaminostyryl)benzothiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxy-carbonylphenyl)-1,2'-biimidazole, 2,2'-bis(2,4-dichlorophenyl)-4,4',5,5'-tetra-phenyl-1,2'-biimidazole, 2,2'-bis(2,4-dibromophenyl)-4,4',5,5'-tetra-phenyl-1,2'-biimidazole, 2,2'-bis(2,4,6-trichlorophenyl)-4,4',5,5'-tetra-phenyl-1,2'-biimidazole, 3-(2-methyl-2-dimethylaminopropionyl)carbazole, 3,6-bis(2-methyl-2-morpholinopropionyl)-9-n-dodecyl-carbazole, 1-hydroxychclohexyl phenyl ketone, and bis($\eta^5$-2,4-cyclopentadien-1-yl)-bis(2,6-difluoro-3-(1H-pyrrol-1-yl)titanium. Among these polymerization initiators, 3,3',4,4'-tetra(t-butylperoxycarbonyl)benzophenone, 3,3',4,4'-tetra(t-hexylperoxycarbonyl)benzophenone, 3,3'-di(methoxycarbonyl)-4,4'-di(t-butylperoxycarbonyl)-benzophenone, 3,4'-di(methoxycarbonyl)-4,3'-di(t-butylperoxycarbonyl)-benzophenone, 4,4'-di(methoxycarbonyl)-3,3'-di(t-butylperoxycarbonyl)-benzophenone and the like are preferred.

The compounds used as the polymerization initiator may be used solely or as a mixture of two or more of them.

The amount of the polymerization initiator used in the production method of the invention is preferably approximately from 0.01 to 10% by mol based on the total molar number of the monomers.

In the addition polymerization process in the production method of the invention, a chain transfer agent may be used. The use of a chain transfer agent enables appropriate control of the molecular weight of the polymer. Examples of the chain transfer agent capable of being used in the polymerization process include a mercaptan compound, such as thio-β-naphthol, thiphenol, butylmercaptan, ethylthioglycolate, mercaptoethanol, mercaptoacetic acid, isopropylmercaptan, t-butylmercaptan, dodecanethiol, thiomalic acid, pentaerythritol tetra(3-mercaptopropionate) and pentaerythrytol tetra (3-mercaptoacetate); and a disulfide compound, such as diphenyldisulfide, diethyldithioglycolate and diethyldisulfide; and also include toluene, methylisobutylate, carbon tetrachloride, isopropylbenzene, diethyl ketone, chloroform, ethylbenzene, butyl chloride, sec-butyl alcohol, methyl ethyl ketone, methyl isobutyl ketone, propylene chloride, methylchloroform, t-butylbenzene, butyl alcohol, isobutyl alcohol, acetic acid, ethyl acetate, acetone, dioxane, tetrachlorethane, chlorobenzene, methylcyclohexane, t-butyl alcohol and benzene. In particular, the use of mercaptoacetic acid as a chain transfer agent is preferred since the molecular weight of the polymer is lowered, and the molecular weight distribution thereof is uniformized.

The chain transfer agents may be used solely or as a mixture of two or more of them.

The addition polymerization process in the production method of the invention may employ such a polymerization method as a solution polymerization method, an emulsion polymerization method, a suspension polymerization method, a bulk polymerization method, a bulk-suspension polymerization method, a dispersion polymerization method, a soap-free emulsion polymerization method, a seed emulsion polymerization method, a microemulsion polymerization method, a miniemulsion polymerization method and a supercritical carbon dioxide polymerization method.

In the case where a solution polymerization method is used in the addition polymerization in the production method of the invention, for example, such a method may be employed that the fluorosilsesquioxane having an addition-polymerizable functional group (monomer 1M), the organopolysiloxane having an addition-polymerizable functional group (monomer 2M) depending on necessity, the other addition addition-polymerizable monomers depending on necessity, the polymerization initiator, the chain transfer agent and the like are dissolved in a suitable solvent, and the resulting solution is heated or irradiated with an active energy ray to perform addition polymerization reaction.

Examples of the solvent used in the solution polymerization method include a hydrocarbon solvent (such as benzene and toluene), an ether solvent (such as diethyl ether, tetrahydrofuran, diphenyl ether, anisole and dimethoxybenzene), a halogenated hydrocarbon solvent (such as methylene chloride, chloroform and chlorobenzene), a ketone solvent (such as acetone, methyl ethyl ketone and methyl isobutyl ketone), an alcohol solvent, (such as methanol, ethanol, propanol, isopropanol, butyl alcohol and t-butyl alcohol), a nitrile solvent (such as acetonitrile, propionitrile and benzonitrile), an ester solvent (such as ethyl acetate and butyl acetate), a carbonate solvent (such as ethylene carbonate and propylene carbonate), an amide solvent (such as N,N-dimethylformamide and N,N-dimethylacetamide), a hydrochlorofluorocarbon solvent (such as HCFC-141b and HCFC-225), a hydrofluorocarbon (HFCs) solvent (such as HFCs having from 2 to 4, 5 and 6 or more carbon atoms), a perfluorocarbon solvent (such as perfluoropentane and perfluorohexane), an alicyclic hydrofluorocarbon solvent (such as fluorocyclopentane and fluorocyclobutane), an oxygen-containing fluorine solvent (such as a fluoroether, a fluoropolyether, a fluoroketone and a fluoroalcohol) and an aromatic fluorine solvent (such as α,α,α-trifluorotoluene and hexafluorobenzene).

These solvents may be used solely or as a mixture of two or more of them.

The solvent used in solution polymerization is preferably used in such an amount that provides a monomer concentration of approximately from 10 to 80% by weight. The reaction temperature is not particularly limited and is preferably approximately from 0 to 220° C., and particularly preferably from 10 to 150° C.

The addition polymerization reaction in the production method of the invention may be performed under reduced pressure, ordinary pressure or increased pressure, depending on the kinds of the monomers and solvent.

The addition polymerization reaction in the production method of the invention is preferably performed under an atmosphere of an inert gas, such as nitrogen and argon, whereby radicals generated are prevented from being deactivated through contact with oxygen, thereby preventing the reaction rate from being lowered, and thus such a polymer can be obtained that is appropriately controlled in molecular weight. The polymerization reaction in the invention is preferably performed in a polymerization system, from which dissolved oxygen has been removed under reduced pressure. After removing dissolved oxygen under reduced pressure, the polymerization reaction may be performed under the same reduced pressure.

The polymer obtained in the solution by the solution polymerization or the like may be purified or isolated in an ordinary method, and may be used in the form of the solution for forming a coated film.

In the case where the polymer of the invention is purified, the purification method preferably includes a reprecipitation operation, which may be performed in the following manner. To a polymerization reaction solution containing a polymer and an unreacted monomer, a solvent that does not dissolve the polymer but dissolves the unreacted monomers, i.e., a so-called precipitation agent, is added to precipitate only the polymer. The amount of the precipitation agent used is preferably from 20 to 50 times the weight of the polymerization reaction solution.

Preferred examples of the precipitation agent include such a solvent that is compatible with the solvent used in the polymerization reaction, completely does not dissolve the polymer, dissolves only the unreacted monomers, and has a relatively low boiling point. Specific preferred examples of the precipitation agent include a lower alcohol and an aliphatic hydrocarbon. Particularly preferred examples thereof among these include methanol, ethanol, 2-propanol, hexane and heptane. These precipitation agents may be used solely or as a mixture of two or more of them. Upon using a mixture thereof, Solmix AP-1, A-11 or the like, available as a modified alcohol from Japan Alcohol Trading Co., Ltd., may be used.

The repetition number of the reprecipitation operation may be increased for enhancing the removal efficiency of the unreacted monomers. Only the polymer can be deposited in the poor solvent by the operation, and the polymer can be separated from the unreacted monomers by filtration.

2.5 Structure of Polymer Obtained by Production Method of Polymer of the Invention The polymer obtained by the production method of a polymer of the invention may be an ordered polymer, such as a block copolymer, or may be a random polymer, and is preferably a random polymer. The polymer of the invention may have a crosslinked structure and may be a graft polymer.

3. Purpose of Polymer of the Invention

The polymer of the invention can be used as a treating agent for a water-repelling and oil-repelling treatment, an antifouling treatment, a charge controlling treatment and the like, and the treating agent is particularly preferably used as a surface treating agent applied to a surface of an article to be treated.

In the case where the polymer of the invention is used as a treating agent, the polymer of the invention may be used solely or as a mixture of the polymer of the invention and a solution or a dispersion liquid as an additive.

In the mixture of the polymer of the invention and a solution or a dispersion liquid, the concentration of the solid content (including the polymer of the invention and other polymers) is not particularly limited and is preferably approximately from 0.01 to 50% by weight.

The solvent, in which the polymer of the invention is dissolved or dispersed, may be a solvent that is inert to the polymer of the invention, and examples thereof include an aromatic hydrocarbon solvent, such as toluene and xylene, an ester solvent, such as ethyl acetate and butyl acetate, a ketone solvent, such as methyl ethyl ketone and cyclohexanone, a glycol ether ester solvent, such as ethylene glycol ethyl ether acetate, propylene glycol methyl ether acetate and ethyl 3-ethoxypropionate, an ether solvent, such as tetrahydrofuran and dioxane, and a polar solvent, such as dimethylformamide, dimethylacetamide, N-methylpyrrolidone and furfural, which may be used solely or as a mixture of two or more of them.

In the case where the polymer of the invention is used with a solution or a dispersion liquid, an arbitrary component, such as a resin, may be further added and dissolved therein.

The treating agent of the invention may be used as an additive that is added to an article to be treated, and as a coating agent for forming a coated film by coating on an article to be treated.

The use of the surface treating agent of the invention as an additive improves another resin in various characteristics (such as mechanical property, surface or interface property and compatibility) inherent to the resin.

The use of the surface treating agent of the invention as a coating agent, for example, by coating on an article to be treated, followed by drying and curing depending on necessity, provides a coated film on the surface of the article to be treated (substrate). The coated film thus formed, for example, has low surface free energy to provide high water repellency and oil repellency.

In the case where the mixture of the polymer of the invention and a solution or a dispersion liquid is used as a coating agent, the surface of the article to be treated may be treated by a known coating method, such as coating, dipping and spraying. The solution or dispersion liquid thus coated is dried preferably under an environment of from 10 to approximately 200° C.

In the case where the copolymer of the invention is used as a surface-treating agent, the copolymer containing the constitutional unit 1 and the constitutional unit 2 preferably has a molar ratio of the constitutional unit 1 and the constitutional unit 2 of from 0.1/99.9 to 99.9/0.1. In the case where the polymer of the invention contains the constitutional unit 3 and the constitutional unit 4 as arbitrary constitutional units, the molar ratio of the constitutional unit 1 and the arbitrary constitutional units is preferably approximately from 0.01/99.99 to 99.99/0.01, and the molar ratio of the constitutional unit 2 and the arbitrary constitutional unit 4 is preferably approximately from 0.01/99.99 to 99.99/0.01.

The article to be treated with the surface-treating agent of the invention (substrate) is not particularly limited, and examples thereof include a transparent glass substrate, such as purified plate glass (white plate glass), ordinary plate glass (blue plate glass) and silica-coated blue plate glass; a sheet or film of a synthetic resin, such as polycarbonate, polyester, an acrylic resin, a vinyl chloride resin, an aromatic polyamide resin, polyamideimide and polyimide; a transparent resin substrate for optical purposes, such as a cycloolefin resin including a norbornene resin, a methyl methacrylate-styrene copolymer, polysulfone, an alicyclic acrylic resin and polyarylate; a metallic substrate, such as an aluminum plate, a copper plate, a nickel plate and a stainless steel plate; a ceramic plate; a semiconductor plate having a photoelectric conversion device; vegetable-derived or animal-derived natural fibers, such as cotton, hemp and wool; synthetic fibers, such as polyamide, polyester, polyvinyl alcohol, polyacrylonitrile, polyvinyl chloride and polypropylene; semi-synthetic fibers, such as rayon and acetate fibers; inorganic powder, such as silicic acid, silicic anhydride, magnesium silicate, talc, kaolin, mica, bentonite, titanium-coated mica, bismuth oxychloride, zirconium oxide, magnesium oxide, zinc oxide, titanium dioxide, aluminum oxide, calcium sulfate, barium sulfate, magnesium sulfate, calcium carbonate, magnesium carbonate, iron oxide, ultramarine blue pigment, iron blue pigment, chromium oxide, chromium hydroxide, carbon black and composite materials thereof; resin powder, such as polyamide, polyester, polyethylene, polypropylene, polystyrene, polyurethane, a vinyl resin, an epoxy resin, a polycarbonate resin, a divinylbenzene-styrene copolymer and copolymers containing two or more monomers constituting these polymers; organic powder, such as celluloid, acetyl cellulose, cellulose, a polysaccharide, a protein, C.I. Pigment Yellow, C.I. Pigment Orange and C.I. Pigment Green; a paper substrate, such as Japanese paper, ordinary paper, high quality paper, glassine paper, kraft paper, Clupak paper, creped paper, clay-coated paper, topcoat paper and synthetic paper; and a cloth, such as a woven cloth and a nonwoven cloth.

The article to be treated may be subjected to a pre-treatment, and examples of the pretreatment of the substrate include a chemical treatment with a silane coupling agent or the like, a sand-blasting treatment, a corona discharge treatment, an ultraviolet ray treatment, a plasma treatment, an ion-plating treatment, a sputtering treatment, a gas-phase reaction treatment and a vacuum deposition treatment.

Specific examples of purposes of the surface-treating agent of the invention include a surface-treating agent for members of an electronic duplicating apparatus, such as nonadhesive property imparted to a photoreceptor drum, a fixing roller, a magnetic roller, a rubber roller and the like, and sliding property imparted to a releasing pawl, a surface-treating agent for antifouling top-coating and hard-coating for automobiles, an antifouling treating agent for a resin for optical purposes used in a lens or the like, an anti-fogging agent, an antifouling agent for a building member, such as a wall material and a floor material, a releasing agent for a mold used for nanoimprinting, an improver for a resist material, a water-repelling and oil-repelling agent for a printed circuit board, an antifouling agent for a protective film used in a display device, a surface-improving agent for antifouling and prevention of finger prints for a touch-sensitive panel, a releasing agent for imparting a releasing function to a film of polyester or the like, and a water-repelling and oil-repelling agent and an antifouling agent for fibers.

The surface-treating agent of the invention can be also used as a treating agent for coagulation prevention and charge enhancement of a toner. The toner may be such a toner that is produced by a pulverizing method or a polymerization method, and examples of the polymerization method include an emulsion polymerization method, a suspension polymerization method, a solution-suspension polymerization method and an ester-extending polymerization method.

EXAMPLES

The invention will be described in more detail with reference to examples and the like below, but the invention is not limited to the description.

The molecular weights in Examples 1 to 4 were all polystyrene conversion values obtained by GPC (gel permeation chromatography). The measurement conditions of GPC are shown below.

Chromatography device: JASCO GULLIVER 1500, available from JASCO Corporation (intelligent differential refractometer, RI-1530)
Solvent: tetrahydrofuran (THF)
Flow rate: 1 mL/min
Column temperature: 40° C.
Column used: columns, available from Showa Denko Co., Ltd., connected in series
    Shodex KF-G×1
    (guard column)
    Shodex KF-804L×2
    (exclusion limit molecular weight (polystyrene): 400,000)
Standard sample for calibration curve: Shodex Standard M-75 (polymethyl methacrylate), available from Showa Denko Co., Ltd.

The measurement conditions of GPC in Synthesis Example 1 were the same as in Examples 1 to 4 except that TSK guard column HXL-L (guard column), TSK gel G1000HxL (exclusion limit molecular weight (polystyrene): 1,000) and TSK gel G2000HxL (exclusion limit molecular weight (polystyrene): 10,000), all available from Tosoh Corporation, were used and connected in series, and Polymer Standard (PL/polystyrene), available from Polymer Laboratories, was used as a standard sample for calibration curve.

Synthesis Example 1

Synthesis of γ-methacryloxypropylhepta(trifluoropropyl)-$T_8$-silsesquioxane

Trifluoropropyltrimethoxysilane (100 g), THF (500 mL), deionized water (10.5 g) and sodium hydroxide (7.9 g) were charged in a four-neck flask having a capacity of 1 L equipped with a reflux condenser, a thermometer and a dropping funnel, and the contents were heated over an oil bath from room temperature to a temperature where THF was refluxed under stirring with a magnetic stirrer. The reaction mixture was stirred for 5 hours from the start of refluxing, thereby completing the reaction. Thereafter, the flask was taken out from the oil bath, and after allowing to stand overnight, the flask was again set on the oil bath to concentrate the reaction mixture under constant pressure until a solid matter was deposited.

The product thus deposited was separated by filtration with a pressure strainer equipped with a membrane filter having a pore size of 0.5 μm. The solid matter thus obtained was rinsed once with THF and dried in a vacuum dryer at 80° C. for 3 hours to provide 74 g of a solid matter in the form of colorless powder.

The resulting solid matter (65 g), dichloromethane (491 g) and triethylamine (8.1 g) were charged in a four-neck flask having a capacity of 1 L equipped with a reflux condenser, a thermometer and a dropping funnel, and the contents were cooled to 3° C. over an ice bath. γ-Methacryloxypropyltrichlorosilane (21.2 g) was then added thereto, and after confirming that heat generation receded, the flask was taken off from the ice bath, followed by aging at room temperature overnight. The reaction mixture was rinsed with ion exchanged water three times, and the dichloromethane layer was dehydrated over anhydrous magnesium sulfate, and then anhydrous magnesium sulfate was removed by filtration. The dichloromethane layer was concentrated with a rotary evaporator until a viscous solid matter was deposited, to which 260 g of methanol was added, and then stirred until a powder matter was obtained. The resulting powder was filtered with a pressure strainer equipped with 5 μm filter paper and dried in a vacuum dryer at 65° C. for 3 hours to provide 41.5 g of a compound 1M-1 represented by the formula (1M-1) (γ-methacryloxypropylhepta(trifluoropropyl)-T$_8$-silsesquioxane (colorless powder solid).

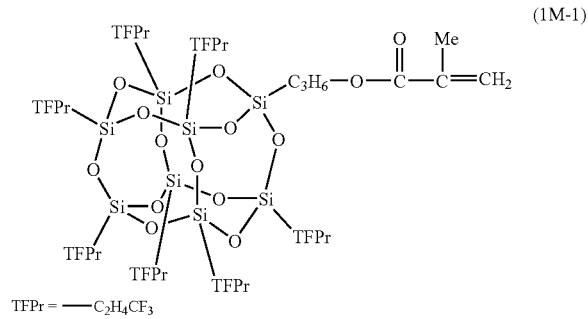

TFPr = —C$_2$H$_4$CF$_3$

Figure 2:
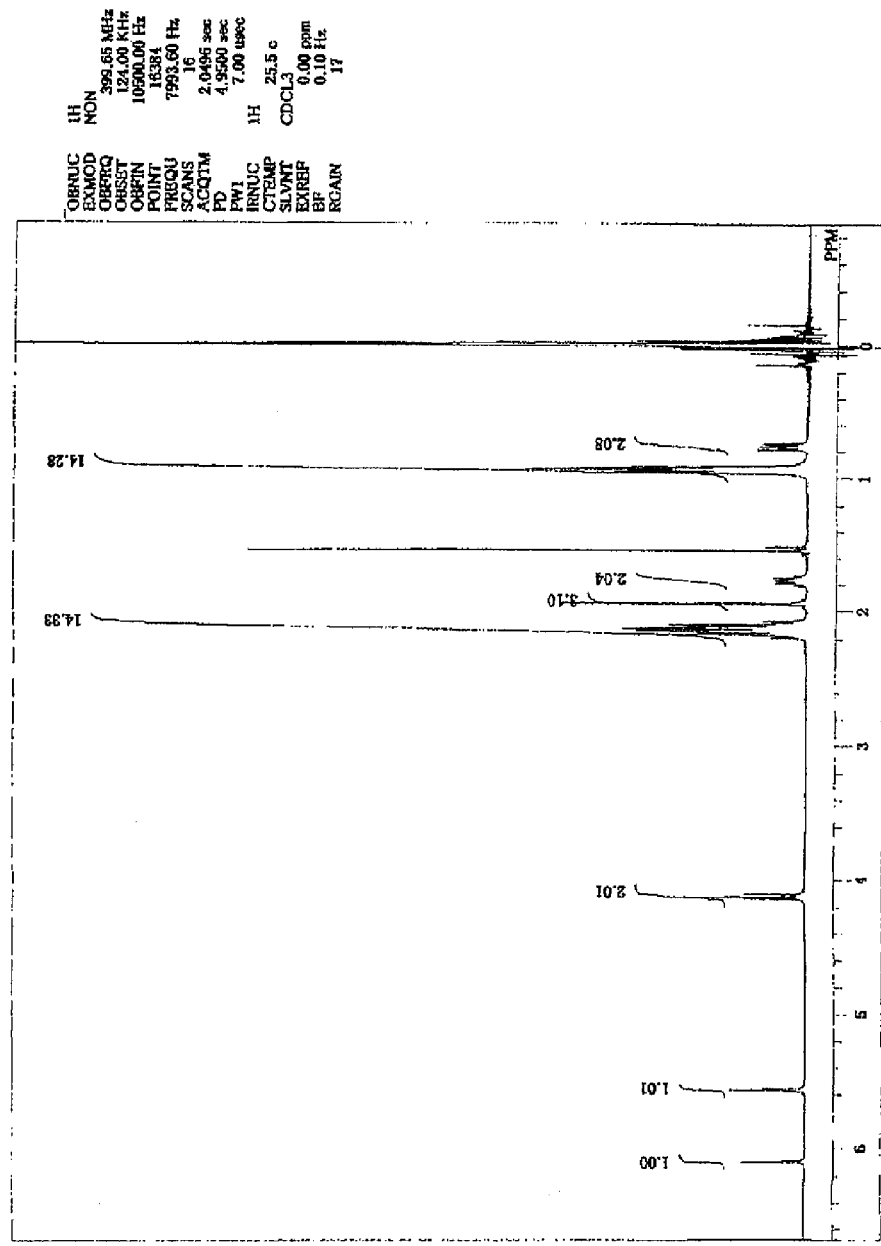
FIG. 2 is a diagram showing results of $^1$H-NMR measurement of the compound 1M-1 synthesized in Synthesis Example 1.

The GPC measurement of the resulting powder solid matter provided the measurement results shown in FIG. 1. The $^1$H-NMR measurement thereof provided the measurement results shown in FIG. 2.

Example 1

Synthesis of Polymer a-1

21.6 g of the compound 1M-1, 2.18 g of methyl methacrylate (MMA), 0.27 g of one-end methacryloxy group-modified dimethylsilicone (FM-0721, molecular weight: ca. 6,400) and 35.83 g of 2-butanone (MEK) were charged in a four-neck flask having a capacity of 100 mL equipped with a reflux condenser, a thermometer and a dropping funnel, which was sealed with nitrogen. The flask was set on an oil bath maintained at 95° C. for refluxing to perform deoxidation for 15 minutes. A solution containing 0.1081 g of 2,2'-azobisisobutyronitrile (AIBN) and 0.0626 g of mercaptoacetic acid (AcSH) dissolved in 1.519 g of MEK was added to the reaction system to start polymerization while maintaining the refluxing temperature. After performing the polymerization for 3 hours, a solution containing 0.1081 g of AIBN dissolved in 0.9752 g of MEK was added thereto, and the polymerization was further continued for 2 hours. After completing the polymerization, the reaction mixture was poured into 600 mL of modified alcohol (Solmix AP-1, available from Japan Alcohol Trading Co., Ltd., to deposit a polymer. After removing the supernatant, the polymer was dried under reduced pressure (at 40° C. for 3 hours and 60° C. for 3 hours), dissolved again in MEK to make a solid content of 50% by weight, and poured into 400 mL of AP-1 to deposit the polymer again. After removing the supernatant, the polymer was dried under reduced pressure (at 40° C. for 3 hours and 60° C. for 3 hours) to provide 17.8 g of a polymer a-1.

The weight average molecular weight and a molecular weight distribution of the polymer a-1 obtained by GPC analysis and the weight ratio (% by weight) of the monomer components in the polymer a-1 obtained by $^1$H-NMR measurement are shown in Table 1.

Example 2

Synthesis of Polymer a-2

16.8 g of the compound 1M-1, 7.03 g of MMA, 0.17 g of FM-0721 and 35.86 g of MEK were charged in a four-neck flask having a capacity of 100 mL equipped with a reflux condenser, a thermometer and a dropping funnel, which was sealed with nitrogen. The flask was set on an oil bath maintained at 95° C. for refluxing to perform deoxidation for 15 minutes. A solution containing 0.0872 g of AIBN and 0.0510 g of AcSH dissolved in 1.223 g of MEK was added to the reaction system to start polymerization while maintaining the refluxing temperature. After performing the polymerization for 3 hours, a solution containing 0.0873 g of AIBN dissolved in 0.7858 g of MEK was added thereto, and the polymerization was further continued for 2 hours. After completing the polymerization, the reaction mixture was poured into 600 mL of heptane to deposit a polymer. After removing the supernatant, the polymer was dried under reduced pressure (at 40° C. for 3 hours and 60° C. for 3 hours), dissolved again in MEK to make a solid content of 50% by weight, and poured into 350 mL of heptane to deposit the polymer again. After removing the supernatant, the polymer was dried under reduced pressure (at 40° C. for 3 hours and 60° C. for 3 hours) to provide 16.5 g of a polymer a-2.

The weight average molecular weight and a molecular weight distribution of the polymer a-2 obtained by GPC analysis and the weight ratio (% by weight) of the monomer components in the polymer a-2 obtained by $^1$H-NMR measurement are shown in Table 1.

Example 3

Synthesis of Polymer a-3

12.0 g of the compound 1M-1, 11.88 g of MMA, 0.12 g of FM-0721 and 35.7 g of MEK were charged in a four-neck flask having a capacity of 100 mL equipped with a reflux condenser, a thermometer and a dropping funnel, which was sealed with nitrogen. The flask was set on an oil bath maintained at 95° C. for refluxing to perform deoxidation for 15 minutes. A solution containing 0.1934 g of AIBN and 0.1085 g of AcSH dissolved in 2.7176 g of MEK was added to the reaction system to start polymerization while maintaining the refluxing temperature. After performing the polymerization for 3 hours, a solution containing 0.1934 g of AIBN dissolved in 1.741 g of MEK was added thereto, and the polymerization was further continued for 2 hours. After completing the polymerization, the reaction mixture was poured into 600 mL of heptane to deposit a polymer. After removing the supernatant, the polymer was dried under reduced pressure (at 40° C. for 3 hours and 60° C. for 3 hours), dissolved again in MEK to make a solid content of 50% by weight, and poured into 350 mL of heptane to deposit the polymer again. After removing the supernatant, the polymer was dried under reduced pressure (at 40° C. for 3 hours and 60° C. for 3 hours) to provide 19.7 g of a polymer a-3.

The weight average molecular weight and a molecular weight distribution of the polymer a-3 obtained by GPC analysis and the weight ratio (% by weight) of the monomer components in the polymer a-3 obtained by $^1$H-NMR measurement are shown in Table 1.

Example 4

Synthesis of Polymer a-4

23.8 g of the compound 1M-1, 0.24 g of FM-0721 and 35.86 g of MEK were charged in a four-neck flask having a capacity of 100 mL equipped with a reflux condenser, a thermometer and a dropping funnel, which was sealed with nitrogen. The flask was set on an oil bath maintained at 95° C. for refluxing to perform deoxidation for 15 minutes. A solution containing 0.0913 g of AIBN and 0.0512 g of AcSH dissolved in 1.2829 g of MEK was added to the reaction system to start polymerization while maintaining the refluxing temperature. After performing the polymerization for 3 hours, a solution containing 0.0193 g of AIBN dissolved in 0.8218 g of MEK was added thereto, and the polymerization was further continued for 2 hours. After completing the polymerization, the reaction mixture was poured into 600 mL of AP-1 to deposit a polymer. After removing the supernatant, the polymer was dried under reduced pressure (at 40° C. for 3 hours and 60° C. for 3 hours) to provide 7.5 g of a polymer a-4.

The weight average molecular weight and a molecular weight distribution of the polymer a-4 obtained by GPC analysis and the weight ratio (% by weight) of the monomer components in the polymer a-4 obtained by $^1$H-NMR measurement are shown in Table 1.

Example 5

Synthesis of Polymer a-5

21.6 g of the compound a-1, 2.18 g of 2,2,2-trifluoroethyl methacrylate (TFEMA), 0.22 g of FM-0721 and 35.87 g of MEK were charged in a four-neck flask having a capacity of 100 mL equipped with a reflux condenser, a thermometer and a dropping funnel, which was sealed with nitrogen. The flask was set on an oil bath maintained at 95° C. for refluxing to perform deoxidation for 15 minutes. A solution containing 0.084 g of AIBN and 0.0471 g of AcSH dissolved in 1.1798 g of MEK was added to the reaction system to start polymerization while maintaining the refluxing temperature. After performing the polymerization for 3 hours, a solution containing 0.084 g of AIBN dissolved in 0.7558 g of MEK was added thereto, and the polymerization was further continued for 2 hours. After completing the polymerization, the reaction mixture was poured into 600 mL of AP-1 to deposit a polymer. After removing the supernatant, the polymer was dried under reduced pressure (at 40° C. for 3 hours and 60° C. for 3 hours) to provide 18.7 g of a polymer a-5.

The weight average molecular weight and a molecular weight distribution of the polymer a-5 obtained by GPC analysis and the weight ratio (% by weight) of the monomer components in the polymer a-5 obtained by $^1$H-NMR measurement are shown in Table 1.

Production of Coated Film

The resulting polymers a-1 to a-5 were each dissolved in ethyl acetate to a polymer concentration of 30% by weight. The resulting solutions were each coated on a polyethylene terephthalate film (PET film, thickness: 50 μm, Lumirror #50-T60, a trade name, available from Toray Industries, Inc.) with a coating rod (#4, available from R.D. Specialities). The resulting coated films were each dried in a high-temperature chamber at 100° C. for 3 minutes to provide films a-1 to a-5 each having a transparent coated film formed thereon.

Measurement of Contact Angle

The films a-1 to a-5 and the PET film having no coated film were measured for contact angle (degree) of distilled water (for measuring nitrogen and phosphorus, available from Kanto Kagaku Co., Ltd.) and methylene iodide (99%, available from Sigma-Aldrich Corporation) as probe liquids with a FACE contact angle meter (image analysis type) Model CA-X (available from Kyowa Interface Science Co., Ltd.), and the surface free energy (mN/m) was calculated according to the Kaelble-Uy theory. The results obtained are shown in Table 2.

TABLE 2

| Test example | Polymer | Fluorine content (% by weight) | Contact angle Distilled water | Contact angle Methylene iodide | Surface free energy (mN/m) |
|---|---|---|---|---|---|
| Film a-1 | a-1 | 29.8 | 103.1° | 68.0° | 24.0 |
| Film a-2 | a-2 | 22.6 | 101.2° | 65.2° | 25.6 |
| Film a-3 | a-3 | 16.6 | 102.3° | 65.6° | 25.4 |
| Film a-4 | a-4 | 32.5 | 102.5° | 68.7° | 23.6 |
| Film a-5 | a-5 | 29.5 | 101.7° | 64.9° | 25.8 |
| untreated PET film | | | 69.6° | 26.0° | 48.4 |

As shown in Table 2, the films obtained by surface-treating with the surface-treating agents containing the polymer of the invention exhibited high water repellency and oil repellency as compared to the surface of the film that was not treated.

Measurement of Releasing Electrification Voltage

The films a-1 to a-5 and the PET film having no coated film were each superimposed on a PET film (Lumirror #50-T60, a trade name), and the assemblies were each compressed with a 2-kg pressing roller by reciprocation five times, and then released to measure for releasing electrification voltage with a static charge measuring device (FMX-002, available from Simco Japan, Co., Ltd.), under conditions of a temperature of 25° C. and a humidity of 7% RH. The results obtained are shown in Table 3.

TABLE 1

| Example | Polymer | Monomer composition (% by weight) Compound 1M-1 | MMA | FM-0721 | TFEMA | Fluorine content (% by weight) | Weight average molecular weight Mw | Molecular weight distribution Mw/Mn |
|---|---|---|---|---|---|---|---|---|
| Example 1 | a-1 | 91.2 | 7.4 | 1.4 | — | 29.8 | 21,800 | 1.32 |
| Example 2 | a-2 | 69.2 | 30.1 | 0.7 | — | 22.6 | 29,800 | 1.56 |
| Example 3 | a-3 | 50.8 | 48.7 | 0.5 | — | 16.6 | 17,600 | 1.49 |
| Example 4 | a-4 | 99.7 | — | 0.3 | — | 32.5 | 216,800 | 2.06 |
| Example 5 | a-5 | 90.4 | — | 1.0 | 8.6 | 29.5 | 69,200 | 1.63 |

TABLE 3

| Test example | Polymer | Fluorine content (% by weight) | Releasing electrification voltage (V) |
|---|---|---|---|
| Film a-1 | a-1 | 29.8 | −2,500 |
| Film a-2 | a-2 | 22.6 | −2,000 |
| Film a-3 | a-3 | 16.6 | −2,000 |

TABLE 3-continued

| Test example | Polymer | Fluorine content (% by weight) | Releasing electrification voltage (V) |
|---|---|---|---|
| Film a-4 | a-4 | 32.5 | −2,900 |
| Film a-5 | a-5 | 29.5 | −3,000 |
| | untreated PET film | | −1,600 |

As shown in Table 3, the films obtained by surface-treating with the surface-treating agents containing the polymer of the invention exhibited a negatively large releasing electrification voltage as compared to the surface of the film that was not treated, and thus it was found that the surface-treating agents had high negative charge imparting effect.

The polymer and the surface-treating agent of the invention can be applied, for example, to a treating agent for coagulation prevention and charge enhancement of a toner, a surface-treating agent for members of an electronic duplicating apparatus, such as nonadhesive property imparted to a photoreceptor drum, a fixing roller, a magnetic roller, a rubber roller and the like, and sliding property imparted to a releasing pawl, a surface-treating agent for antifouling top-coating and hard-coating for automobiles, an antifouling treating agent for a resin for optical purposes used in a lens or the like, an anti-fogging agent, an antifouling agent for a building member, such as a wall material and a floor material, a releasing agent for a mold used for nanoimprinting, an improver for a resist material, a water-repelling and oil-repelling agent for a printed circuit board, an antifouling agent for a protective film used in a display device, a surface-improving agent for antifouling and prevention of finger prints for a touch-sensitive panel, a releasing agent for imparting a releasing function to a film of polyester or the like, and a water-repelling and oil-repelling agent and an antifouling agent for fibers.

What is claimed is:
1. A charge controlling treating agent containing a polymer comprising a constitutional unit 1 represented by the formula (1):

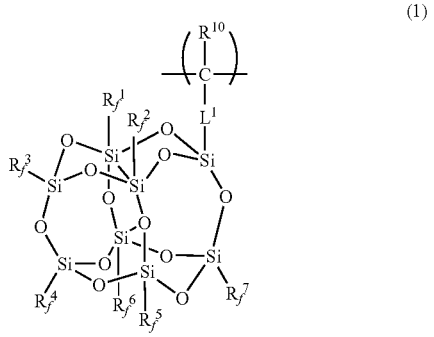

wherein
  $R_f^1$ to $R_f^7$ each independently represent fluoroalkyl having from 1 to 20 carbon atoms, in which arbitrary methylene may be replaced by oxygen, fluoroaryl having from 6 to 20 carbon atoms, in which at least one hydrogen is replaced by fluorine or trifluoromethyl, or fluoroarylalkyl having from 7 to 20 carbon atoms, in which at least one hydrogen in an aryl moiety is replaced by fluorine or trifluoromethyl; and
  $L^1$ represents —$Y^1$—O—CO— in which $Y^1$ represents alkylene having from 2 to 10 carbon atoms bonded to Si, and $R^{10}$ represents hydrogen, alkyl having from 1 to 5 carbon atoms or aryl having from 6 to 10 carbon atoms; or
  $L^1$ represents —$Y^2$-Ph- in which $Y^2$ represents a single bond or alkylene having from 1 to 10 carbon atoms bonded to Si, and $R^{10}$ represents hydrogen;
a constitutional unit 2 represented by the formula (2):

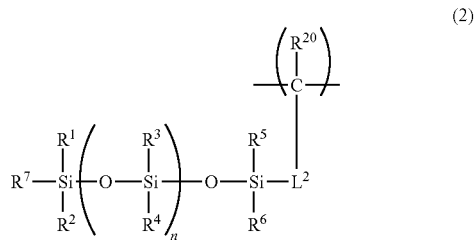

wherein
  n represents an integer of from 1 to 1,000;
  $R^1$ to $R^7$ each independently represents hydrogen, alkyl, aryl or arylalkyl, provided that in the alkyl, aryl or arylalkyl, arbitrary hydrogen may be replaced by fluorine, and arbitrary —$CH_2$— may be replaced by —O— or cycloalkylene; and
  $L^2$ represents —$Y^1$—O—CO— in which $Y^1$ represents alkylene having from 2 to 10 carbon atoms bonded to Si, and $R^{20}$ represents hydrogen, linear or branched alkyl having from 1 to 5 carbon atoms or aryl having from 6 to 10 carbon atoms;
  $L^2$ represents —$X^1$—$Y_p$—O—CO— in which $X^1$ represents alkylene having from 2 to 20 carbon atoms bonded to Si; Y represents —$OCH_2CH_2$—, —$OCHCH_3CH_2$— or —$OCH_2CH(CH_3)$—; and p represents an integer of from 0 to 3, and $R^{20}$ represents hydrogen, alkyl having from 1 to 5 carbon atoms or aryl having from 6 to 10 carbon atoms; or
  $L^2$ represents —$Y^2$-Ph- in which $Y^2$ represents a single bond or alkylene having from 1 to 10 carbon atoms bonded to Si, and $R^{20}$ represents hydrogen; and
at least one selected from the group consisting of a constitutional unit 3 represented by the formula (3)

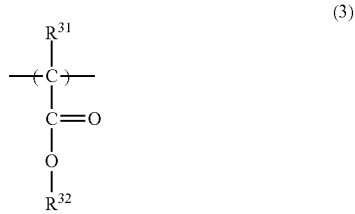

wherein
  $R^{31}$ represents alkyl having from 1 to 30 carbon atoms, aryl having from 6 to 30 carbon atoms or arylalkyl having from 7 to 40 carbon atoms, provided that in the alkyl, aryl and arylalkyl, arbitrary hydrogen may be replaced by fluorine, and arbitrary —$CH_2$— may be replaced by —O— or cycloalkylene; and $R^{32}$ represents alkyl having 1 to 12 carbons, aryl having 6 to 10 carbons or arylalkyl having 7 to 20 carbons, and in the alkyl, the aryl or the arylalkyl, arbitrary hydrogen may be replaced by fluorine and arbitrary —$CH_2$— may be replaced by —O—, and a constitutional unit 4 represented by the formula (4):

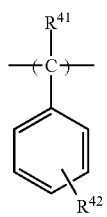
(4)

$R^{41}$ represents hydrogen, alkyl having from 1 to 30 carbon atoms, aryl having from 6 to 30 carbon atoms or arylalkyl having from 7 to 40 carbon atoms, provided that in the alkyl, aryl or arylalkyl, arbitrary hydrogen may be replaced by fluorine, and arbitrary —CH$_2$— may be replaced by —O— or cycloalkylene; and $R^{42}$ represents hydrogen or alkyl having 1 to 10 carbons, and in the alkyl, arbitrary hydrogen may be replaced by fluorine and arbitrary —CH$_2$— may be replaced by —O—.

2. The charge controlling treating agent according to claim 1, wherein in the formula (1), $R_f^1$ to $R_f^7$ each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, heneicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl or α,α,α-trifluoromethylphenyl; and $L^1$ represents —Y$^1$—O—CO— in which Y$^1$ represents alkylene having from 2 to 10 carbon atoms bonded to Si, and $R^{10}$ represents hydrogen, alkyl having from 1 to 5 carbon atoms or aryl having from 6 to 10 carbon atoms; or $L^1$ represents —Y$^2$-Ph- in which Y$^2$ represents a single bond or alkylene having from 1 to 10 carbon atoms bonded to Si, and $R^{10}$ represents hydrogen.

3. The charge controlling treating agent according to claim 1, wherein in the formula (1), $R_f^1$ to $R_f^7$ each independently represent 3,3,3-trifluoropropyl, 3,3,4,4,5,5,6,6,6-nonafluorohexyl or tridecafluoro-1,1,2,2-tetrahydrooctyl;

$R^{10}$ represents hydrogen, alkyl having from 1 to 5 carbon atoms or aryl having from 6 to 10 carbon atoms; and $L^1$ represents a group represented by the formula (5) or (7):

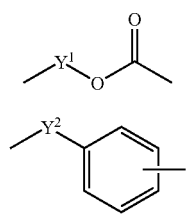
(5)
(7)

wherein
in the formula (5),
Y$^1$ represents alkylene having from 2 to 10, provided that Y$^1$ is bonded to Si, and carbonyl is bonded to C, and in the formula (7)
Y$^2$ represents a single bond or alkylene having from 1 to 10 carbon atoms, provided that Y$^2$ is boded to Si, and phenyl is bonded to C.

4. The charge controlling treating agent according to claim 1, wherein in the formula (2), $R^1$, $R^2$, $R^5$, $R^6$ and $R^7$ each independently represent alkyl, in which arbitrary hydrogen may be replaced by fluorine, aryl, in which arbitrary hydrogen may be replaced by fluorine, or arylalkyl, in which arbitrary hydrogen may be replaced by fluorine;

$R^3$ and $R^4$ each independently represents hydrogen, phenyl or alkyl, in which arbitrary hydrogen may be replaced by fluorine; and $L^2$ represents —Y$^1$—O—CO— in which Y$^1$ represents alkylene having from 2 to 10 carbon atoms bonded to Si, and $R^{20}$ represents hydrogen, linear or branched alkyl having from 1 to 5 carbon atoms or aryl having from 6 to 10 carbon atoms;

$L^2$ represents —X$^1$—Y$_p$—O—CO— in which X$^1$ represents alkylene having from 2 to 20 carbon atoms bonded to Si; Y represents —OCH$_2$CH$_2$—, —OCHCH$_3$CH$_2$— or —OCH$_2$CH(CH$_3$)—; and p represents an integer of from 0 to 3, and $R^{20}$ represents hydrogen, alkyl having from 1 to 5 carbon atoms or aryl having from 6 to 10 carbon atoms; or $L^2$ represents —Y$^2$-Ph- in which Y$^2$ represents a single bond or alkylene having from 1 to 10 carbon atoms bonded to Si, and $R^{20}$ represents hydrogen.

5. The charge controlling treating agent according to claim 1, wherein in the formula (2), $R^1$, $R^2$, $R^5$ and $R^6$ each independently represent methyl or phenyl;

$R^3$ and $R^4$ each independently represents methyl, phenyl or 3,3,3-trifluoropropyl;

$R^7$ represents methyl, ethyl, propyl, butyl, isobutyl, phenyl, 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, heneicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl or α,α,α-trifluoromethylphenyl;

$R^{20}$ represents hydrogen or alkyl having from 1 to 10 carbon atoms, in which hydrogen may be replaced by fluorine; and $L^2$ represents a group represented by the formula (5), (6) or (7):

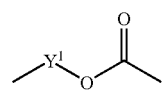
(5)

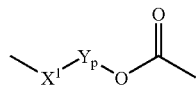
(6)

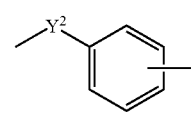
(7)

wherein
in the formula (5),
Y$^1$ represents alkylene having from 2 to 10 carbon atoms, provided that Y$^1$ is bonded to Si, and carbonyl is bonded to C, in the formula (6), $X^1$ represents alkylene having from 2 to 20 carbon atoms; Y represents —$OCH_2CH_2$—, —$OCHCH_3CH_2$— or —$OCH_2CH(CH_3)$—; and p represents an integer of from 0 to 3, provided that $X^1$ is bonded to Si, and carbonyl is bonded to C, and in the formula (7), $Y^2$ represents a single bond or alkylene having from 1 to 10 carbon atoms, provided that $Y^2$ is bonded to Si, and phenyl is bonded to C.

6. The charge controlling treating agent according to claim 1, wherein the polymer further comprises at least one selected from the group consisting of constitutional units derived from a (meth)acrylic acid derivative and a styrene derivative.

7. An article treated with the charge controlling treating agent according to claim 1.

* * * * *